(12) United States Patent
Chang et al.

(10) Patent No.: US 10,076,862 B1
(45) Date of Patent: Sep. 18, 2018

(54) MOLDING SYSTEM

(71) Applicant: CORETECH SYSTEM CO., LTD., Chupei, Hsinchu County (TW)

(72) Inventors: Yuing Chang, Chupei (TW); Rong-Yeu Chang, Chupei (TW); Chia-Hsiang Hsu, Chupei (TW); Chuan-Wei Chang, Chupei (TW); Ching-Chang Chien, Chupei (TW)

(73) Assignee: CORETECH SYSTEM CO., LTD., Chupei, Hsinchu (TW)

( * ) Notice: Subject to any disclaimer, the term of this patent is extended or adjusted under 35 U.S.C. 154(b) by 0 days.

(21) Appl. No.: 15/821,834

(22) Filed: Nov. 23, 2017

(51) Int. Cl.
*B29C 45/77* (2006.01)

(52) U.S. Cl.
CPC ...... *B29C 45/77* (2013.01); *B29C 2945/7604* (2013.01); *B29C 2945/76006* (2013.01); *B29C 2945/76254* (2013.01); *B29C 2945/76498* (2013.01); *B29C 2945/76939* (2013.01); *B29C 2945/76996* (2013.01)

(58) Field of Classification Search
CPC .......... B29C 45/77; B29C 2945/76254; B29C 2945/76996; B29C 2945/76498; B29C 2945/76006; B29C 2945/7604; B29C 2945/76939
See application file for complete search history.

(56) References Cited

U.S. PATENT DOCUMENTS 9,684,295 B2 * 6/2017 Chang ................ B29C 45/7693

OTHER PUBLICATIONS

Rong-yeu Chang and Wen-hsien Yang, Numerical simulation of mold filling in injection molding using a three-dimensional finite volume approach, International Journal for Numerical Methods in Fluids vol. 37, Issue 2, pp. 125-148, Sep. 30, 2001.

* cited by examiner

*Primary Examiner* — Robert J Grun
(74) *Attorney, Agent, or Firm* — Juan Carlos A. Marquez; Marquez IP Law Office, PLLC

(57) ABSTRACT

A molding system includes a molding machine, a mold disposed on the molding machine and having a mold cavity to be filled with a molding resin from the molding machine, and a computing apparatus connected to the molding machine. The computing apparatus is configured to perform operations for setting the molding machine to prepare a molding product, wherein the operations comprise: generating a first and a second state waveforms using a setting packing pressure profile; obtaining an updated packing pressure profile based on the first and the second state waveforms; and setting the molding machine based on the updated packing pressure profile to perform an actual molding process to prepare the molding product. The first and the second state waveforms express a relationship between an in-mold pressure and an in-mold temperature at different sensing sites of the molding resin.

20 Claims, 35 Drawing Sheets

30

31 — Generating a first and second state waveforms by using a setting packing pressure profile, wherein the first and second state waveforms express a relationship between an in-mold pressure and an in-mold temperature at different sensing sites of the molding resin; and wherein a maximum in-mold pressure of the first state waveform is larger than that of the second state waveform 33 — Obtaining an updated packing pressure profile having a first control node and a second control node after the first control node; wherein the first control node has a first packing time when the first state waveform substantially reaches the maximum in-mold pressure; and wherein the first control node has a first packing pressure, the second control node has a second packing pressure smaller than the first packing pressure 35 — Setting the molding machine based on the updated packing pressure profile to perform an actual molding process to prepare the molding product

FIG. 4

| | |
|---|---|
| Polymer | ABS |
| Grade Name | POLYFLAM RABS 90000 UV5 |
| Producer | A. Schulman |
| Comment | MVR(220,10)=30 cm3/10min, D=1.2 g/cc |
| Last modified date | 2010/08/03 |
| | |
| Process condition | Process condition |
| Melt temperature (minimum) | 220 oC |
| Melt temperature (normal) | 235 oC |
| Melt temperature (maximum) | 250 oC |
| Mold temperature (minimum) | 40 oC |
| Mold temperature (normal) | 50 oC |
| Mold temperature (maximum) | 60 oC |
| Ejection temperature | 99.85 oC |
| Freeze temperature | 119.85 oC |

FIG. 7

MOLDING SYSTEM

TECHNICAL FIELD

The present disclosure relates to a molding system capable of setting molding conditions using multiple in-mold state waveforms of the molding resin, and more particularly, to a molding system capable of setting molding conditions using multiple in-mold PVT (Pressure-Specific Volume-Temperature) waveforms of the molding resin.

DISCUSSION OF THE BACKGROUND

Injection molding is a technology commonly used for high-volume manufacturing of parts made of synthetic resin, most commonly made of thermoplastic polymers. During a repetitive injection molding process, a plastic resin, most often in the form of small beads or pellets, is introduced to an injection molding machine that melts the resin beads under heat, pressure, and shear. The resulting molten resin is forcefully injected into a mold cavity having a particular cavity shape. The injected plastic is held under pressure in the mold cavity, cooled, and then removed as a solidified part having a shape that essentially duplicates the cavity shape of the mold.

A typical injection molding procedure comprises four basic operations: (1) heating the plastic in the injection molding machine to allow it to flow under pressure; (2) injecting the melted plastic into a mold cavity or cavities defined between two mold halves that have been closed; (3) allowing the plastic to cool and harden in the cavity or cavities while under pressure; and (4) opening the mold halves to cause the part to be ejected from the mold. In the conventional injection molding of synthetic resin by an injection molding machine, the weight of the injected synthetic resin varies with the molten resin pressure, the molten resin specific volume, the molten resin temperature or other molten resin conditions. Therefore, it is difficult to form products of a consistent quality.

In general, the setting of molding conditions of the injection molding machine requires a large number of trial molding operations and a long setting time because the setting work greatly depends on the know-how and experience of an operator of the injection molding to machine, and various physical values affect one another as well.

Therefore, a virtual molding process, i.e., computer-implemented simulation, using CAE (Computer-Assisted Engineering), is performed for the injection molding, and the molding conditions are then set based on the virtual molding. In virtual molding using CAE, phenomena will occur in a mold cavity within a short period of time. That is, the effects of resin temperature, pressure, shear rate, etc. on molded products can be simulated using CAE. Therefore, if the molding phenomena occurring within a mold cavity can be known accurately, using CAE may enable optimization of molding conditions and a stable molding of non-defective products.

This Discussion of the Background section is for background information only. The statements in this Discussion of the Background are not an admission that the subject matter disclosed in this section constitutes a prior art to the present disclosure, and no part of this section may be used as an admission that any part of this application, including this Discussion of the Background section, constitutes prior art to the present disclosure.

SUMMARY

One aspect of the present disclosure provides a molding system comprising a molding machine; a mold disposed on the molding machine and having a mold cavity to be filled with a molding resin from the molding machine; and a computing apparatus connected to the molding machine. In some embodiments of the present disclosure, the computing apparatus is configured to perform operations for setting the molding machine to prepare a molding product, wherein the operations comprise: generating a first and a second state waveforms using a setting packing pressure profile; obtaining an updated packing pressure profile having a first control node and a second control node after the first control node; and setting the molding machine based on the updated packing pressure profile to perform an actual molding process to prepare the molding product, wherein the first and the second state waveforms express a relationship between an in-mold pressure and an in-mold temperature at different sensing sites of the molding resin, and wherein a maximum in-mold pressure of the first state waveform is larger than that of the second state waveform; wherein the first control node has a first packing time at which the first state waveform substantially reaches the maximum in-mold pressure, and wherein the first control node has a first packing pressure and the second control node has a second packing pressure smaller than the first packing pressure.

In some embodiments of the present disclosure, the setting packing pressure profile has an initial packing pressure, and the computing apparatus is configured to obtain the first packing pressure based on the initial packing pressure.

In some embodiments of the present disclosure, the first state waveform includes an isobaric phase and an isochoric phase following the isobaric phase, and the second control node has a second packing time corresponding to a transition between the isobaric phase and the isochoric phase.

In some embodiments of the present disclosure, the molding resin has a first specific volume at a predetermined ejection temperature and a normal pressure, and a second specific volume at the predetermined ejection temperature and a designed pressure; the second control node has a second packing time between a starting time and an ending time, wherein the starting time corresponds to a time at which the molding resin is isobarically cooled at the maximum in-mold pressure to reach the first specific volume, and the ending time corresponds to a time at which the molding resin is isobarically cooled at the maximum in-mold pressure to reach the second specific volume.

In some embodiments of the present disclosure, the second control node has a second packing pressure, and the computing apparatus is configured to obtain the second packing pressure based on the first packing pressure.

In some embodiments of the present disclosure, the first and the second state waveforms have a first and a second ejection pressures, and the step of obtaining an updated packing pressure profile comprises: calculating a first pressure deviation between the first ejection pressure and an expected ejection pressure, and a second pressure deviation between the second ejection pressure and the expected ejection pressure; and adjusting the first packing pressure based on the first pressure deviation if the first pressure deviation is larger than the second pressure deviation.

In some embodiments of the present disclosure, the updated packing pressure profile has a third control node after the second control node, wherein the third control node has a third packing time at which one of the first and the second state waveforms substantially reaches a maximum in-mold specific volume.

In some embodiments of the present disclosure, the first state waveform includes an isobaric phase and an isochoric phase following the isobaric phase, and the second control node has a second packing time corresponding to a transition between the isobaric phase and the isochoric phase; and the computing apparatus is configured to obtain a third packing pressure of the third control node based on a designed pressure and the maximum in-mold pressure, wherein the designed pressure is obtained based on the in-mold temperature at the third packing time and an in-mold specific volume at the second packing time.

In some embodiments of the present disclosure, the updated packing pressure profile has a third control node after the second control node, wherein the third control node has a third packing time at which a pressure difference between first and second state waveforms reaches a maximum value, and wherein the computing apparatus is configured to obtain a third packing pressure of the third control node based on the pressure difference.

In some embodiments of the present disclosure, the computing apparatus is configured to add a third control node in the updated packing pressure profile if the molding resin is transferred from the molding machine into the mold cavity after the first state waveform substantially reaches the maximum in-mold pressure.

In some embodiments of the present disclosure, the computing apparatus is configured to change the updated packing pressure profile by multiplying the first packing pressure and the second packing pressure by a constant value for changing an ejection pressure of the molding product.

In some embodiments of the present disclosure, the computing apparatus is configured to change the updated packing pressure profile by multiplying the first packing pressure by a constant value.

In some embodiments of the present disclosure, the first state waveform includes an isobaric phase and an isochoric phase following the isobaric phase, and the computing apparatus is configured to change the updated packing pressure profile by changing the second packing time in order to change the isobaric phase.

In some embodiments of the present disclosure, the operation of generating a first and a second state waveforms is performed by a virtual molding process.

In some embodiments of the present disclosure, the operation of generating a first and a second state waveforms is performed by a plurality of sensors disposed at different sensing sites of the mold.

Another aspect of the present disclosure provides a molding system comprising a molding machine; a mold disposed on the molding machine and having a mold cavity to be filled with a molding resin from the molding machine; and a computing apparatus connected to the molding machine. In some embodiments of the present disclosure, the computing apparatus is configured to perform operations for setting the molding machine to prepare a molding product, wherein the operations comprise: generating a first and a second state waveforms using a setting packing pressure profile, wherein the first and the second state waveforms express a relationship between an in-mold specific volume and an in-mold temperature at different sensing sites of the molding resin; obtaining an updated packing pressure profile having a first control node, a second control node after the first control node, and a third control node after the second control node, wherein the first control node has a first packing time at which one of the first and the second state waveforms substantially reaches a maximum in-mold pressure; and setting the molding machine based on the updated packing pressure profile to perform an actual molding to prepare the molding product. In some embodiments of the present disclosure, the first state waveform includes an isobaric phase and an isochoric phase following the isobaric phase, the second control node has a second packing time corresponding to a transition between the isobaric phase and the isochoric phase, and the third control node has a third packing time at which one of the first and the second state waveforms substantially reaches a maximum in-mold specific volume. In some embodiments of the present disclosure, the computing apparatus is configured to obtain a third packing pressure of the third control node based on a designed pressure and the maximum in-mold pressure, wherein the designed pressure is obtained based on the in-mold temperature at the third packing time and the in-mold specific volume at the second packing time.

In some embodiments of the present disclosure, the updated packing pressure profile has a fourth control node after the third control node, wherein the fourth control node has a fourth packing time at which a pressure difference between first and second state waveforms reaches a maximum value, and the computing apparatus is configured to obtain a fourth packing pressure of the fourth control node based on the pressure difference.

Another aspect of the present disclosure provides a molding system comprising a molding machine; a mold disposed on the molding machine and having a mold cavity to be filled with a molding resin from the molding machine; and a computing apparatus connected to the molding machine. In some embodiments of the present disclosure, the computing apparatus is configured to perform operations for setting the molding machine to prepare a molding product, wherein the operations comprise: generating a first and a second state waveforms using a setting packing pressure profile, wherein the first and the second state waveforms express a relationship between an in-mold pressure and an in-mold temperature at different sensing sites of the molding resin; obtaining an updated packing pressure profile having a control node, wherein the control node has a packing time at which a pressure difference between first and second state waveforms reaches a maximum value, and wherein the computing apparatus is configured to obtain a packing pressure of the control node based on the pressure difference; and setting the molding machine based on the updated packing pressure profile to perform an actual molding to prepare the molding product.

The present disclosure adjusts the packing pressure profile based on the plurality of state waveforms expressing the relationship between an in-mold pressure and an in-mold temperature at different sensing sites of the molding resin, so that the packing pressure profile can be used by the molding machine to apply a packing pressure to the molding resin in the mold cavity such that the variation of the specific volume at these sensing sites are substantially the same as the temperature declines. Consequently, the shrinkage problem of the molding product can be effectively solved.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 4 is a flow chart of a method for operating a molding machine in accordance with some embodiments of the present disclosure.

FIG. 7 shows a data sheet of the molding resin in accordance with some embodiments of the present disclosure.

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "some embodiments of the present disclosure," "an embodiment," "exemplary embodiment," "other embodiments of the present disclosure," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a molding system capable of setting molding conditions using multiple in-mold PVT (Pressure-Specific Volume-Temperature) waveforms of the molding resin. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
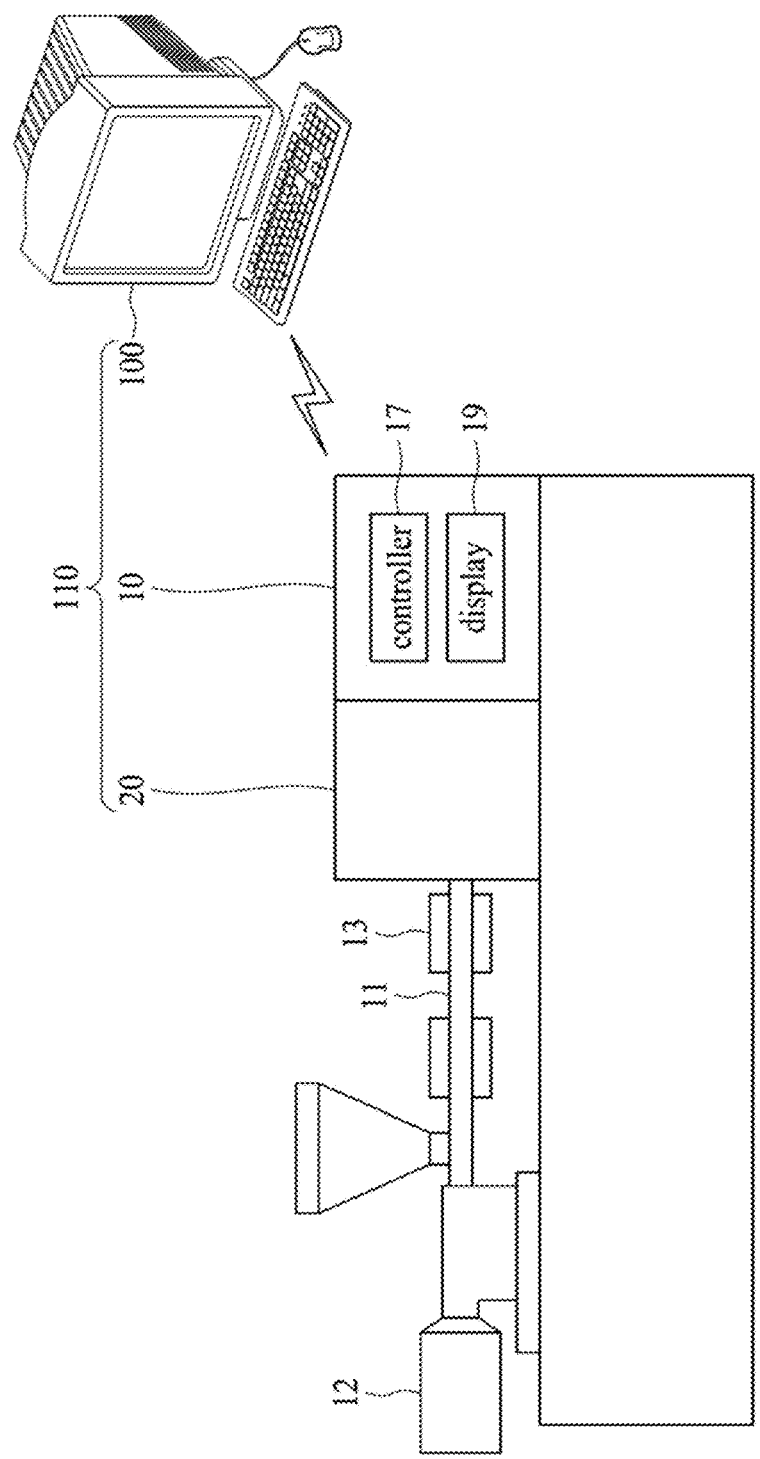
FIG. 1 is a schematic view of an injection molding system in accordance with various embodiments of the present disclosure.
Figure 2:
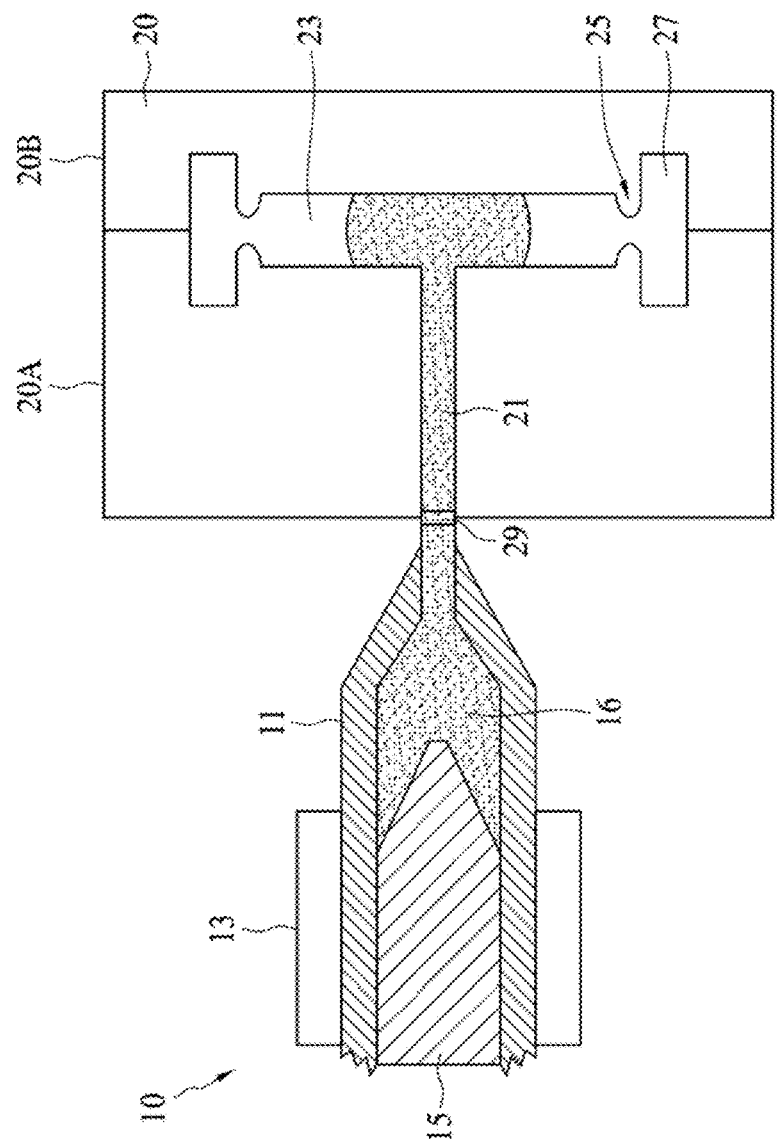
FIG. 2 is a schematic view of a mold in FIG. 1.

FIG. 1 is a schematic view of an injection molding system 110 in accordance with various embodiments of the present disclosure, and FIG. 2 is a schematic view of a mold 20 in FIG. 1. The injection molding system 110 comprises a molding machine 10 such as an injection molding machine and a computing apparatus 100 connected to the injection molding machine 10, wherein the mold 20 is disposed on the molding machine 10. In some embodiments of the present disclosure, the injection molding machine 10 includes a barrel 11 having a screw chamber, heating elements 13 configured to heat the barrel 11, and a screw 15 positioned in the screw chamber in the barrel 11 and driven by a screw-driving motor 12 for feeding a molding resin 16, such as thermoplastics, into a mold cavity 25 of the metal mold 20. In some embodiments of the present disclosure, the molding machine 10 has a controller 17 configured to control the operation of the injection molding machine 10 and a display 19 configured to display information of the injection molding process.

In some embodiments of the present disclosure, the injection molding machine 10 is equipped with sensors for sensing the velocity of the screw 15, the pressure of the molding resin 16 in the barrel 11 in the filling stage (filling pressure) and the temperature of the molding resin 16 in the barrel 11 in the filling stage (filling temperature); and the computing apparatus 100 is connected to the controller 17 and programmed to acquire the information such as velocity and pressure data from the controller 17 through a connection such as a hardwire connection or a wireless connection therebetween.

In some embodiments of the present disclosure, the metal mold 20 is constituted by a fixed-side metal mold 20A and a movable-side metal mold 20B. Inside the metal mold 20, a sprue portion 21, a runner portion 23, a gate portion 25 and a mold cavity 27 are formed so as to be arranged in the above-mentioned order from the injection molding machine 10. The sprue portion 21 of the metal mold 20 is connected to the barrel 11 of the molding machine 10 via a nozzle 29.

Figure 3:
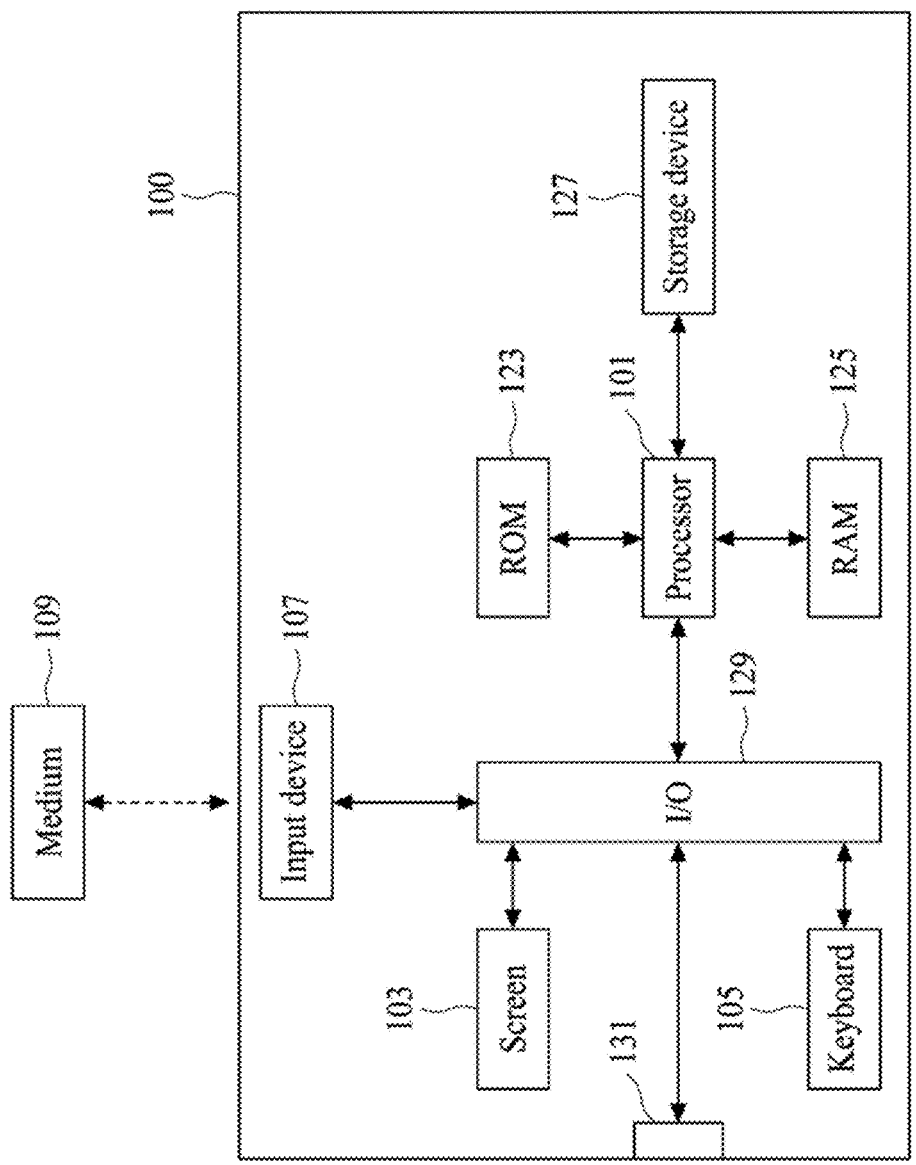
FIG. 3 is a functional block diagram of a computing apparatus in accordance with some embodiments of the present disclosure.

FIG. 3 is a functional block diagram of a computing apparatus 100 in accordance with some embodiments of the present disclosure. In some embodiments of the present disclosure, the computing apparatus 100 comprises a computer processor 101 for performing a computer-implemented injection molding simulation method. In some embodiments of the present disclosure, the computing apparatus 100 includes a read-only memory (ROM) 123, a random access memory (RAM) 125, a storage device 127, and an input/output (I/O) interface 129. The computer processor 101 operably communicates with the ROM 123, the RAM 125, the storage device 127, and the I/O interface 129.

In some embodiments of the present disclosure, the computing apparatus 100 may further include a screen 103, a keyboard 105, and an input device 107 such as a card reader or an optical disk drive. The input device 107 is configured to input computer instructions (software algorithms) stored in a non-transitory computer-readable medium 109, and the computer processor 101 is configured to execute operations for performing a computer-implemented injection molding simulation method according to the computer instructions. The computer processor 101 reads software algorithms from the input device 107 or the storage device 127, executes the calculation steps, and stores the calculated result in the RAM 125. In some embodiments of the present disclosure, the memory devices, i.e., the ROM 123 and the RAM 125, can be programmed to store codes for performing the computer-implemented injection molding simulation method. In some embodiments of the present disclosure, the computing apparatus further comprises a connector 131 configured to form a connection with the controller 17 of the injection molding machine 10.

FIG. 4 is a flow chart of a method 30 for operating a molding machine in accordance with some embodiments of the present disclosure. The method 30 can be considered a molding condition setting method for the molding machine, and comprises a step 31 of generating a first and a second state waveforms using a setting packing pressure profile, wherein the first and the second state waveforms express a relationship between an in-mold pressure and an in-mold temperature at different sensing sites of the molding resin, and wherein a maximum in-mold pressure of the first state waveform is larger than that of the second state waveform; a step 33 of obtaining an updated packing pressure profile having a first control node and a second control node after the first control node, wherein the first control node has a first packing time at which the first state waveform substantially reaches the maximum in-mold pressure, and wherein the first control node has a first packing pressure and the second control node has a second packing pressure smaller than the first packing pressure; and a step 35 of setting the molding machine based on the updated packing pressure profile to perform an actual molding process to prepare the molding product.

The following describes an exemplary process flow of the method 30 in accordance with some embodiments of the present disclosure.

Figure 5:
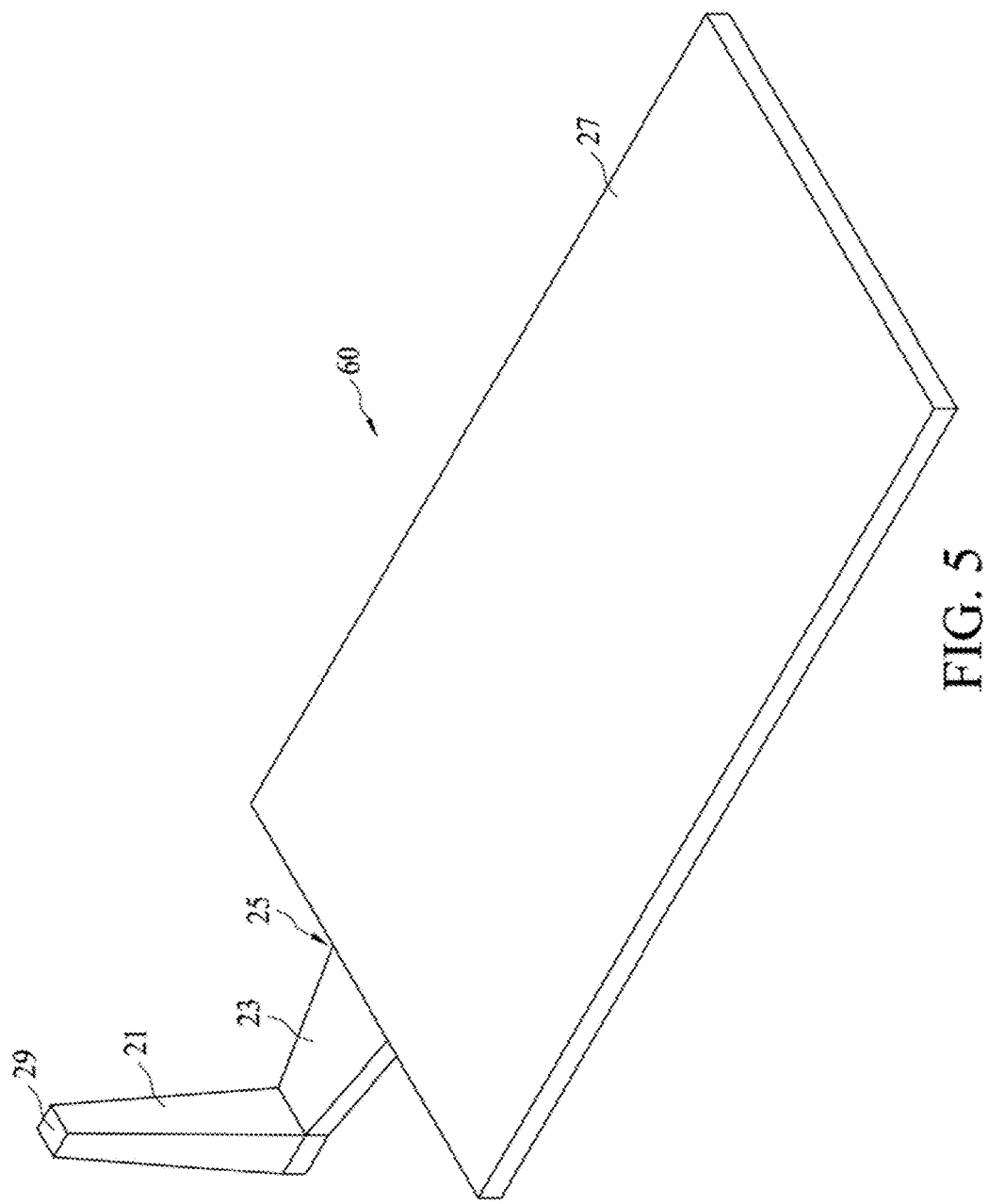
FIG. 5 is a schematic view of a genuine domain in accordance with some embodiments of the present disclosure.
Figure 6:
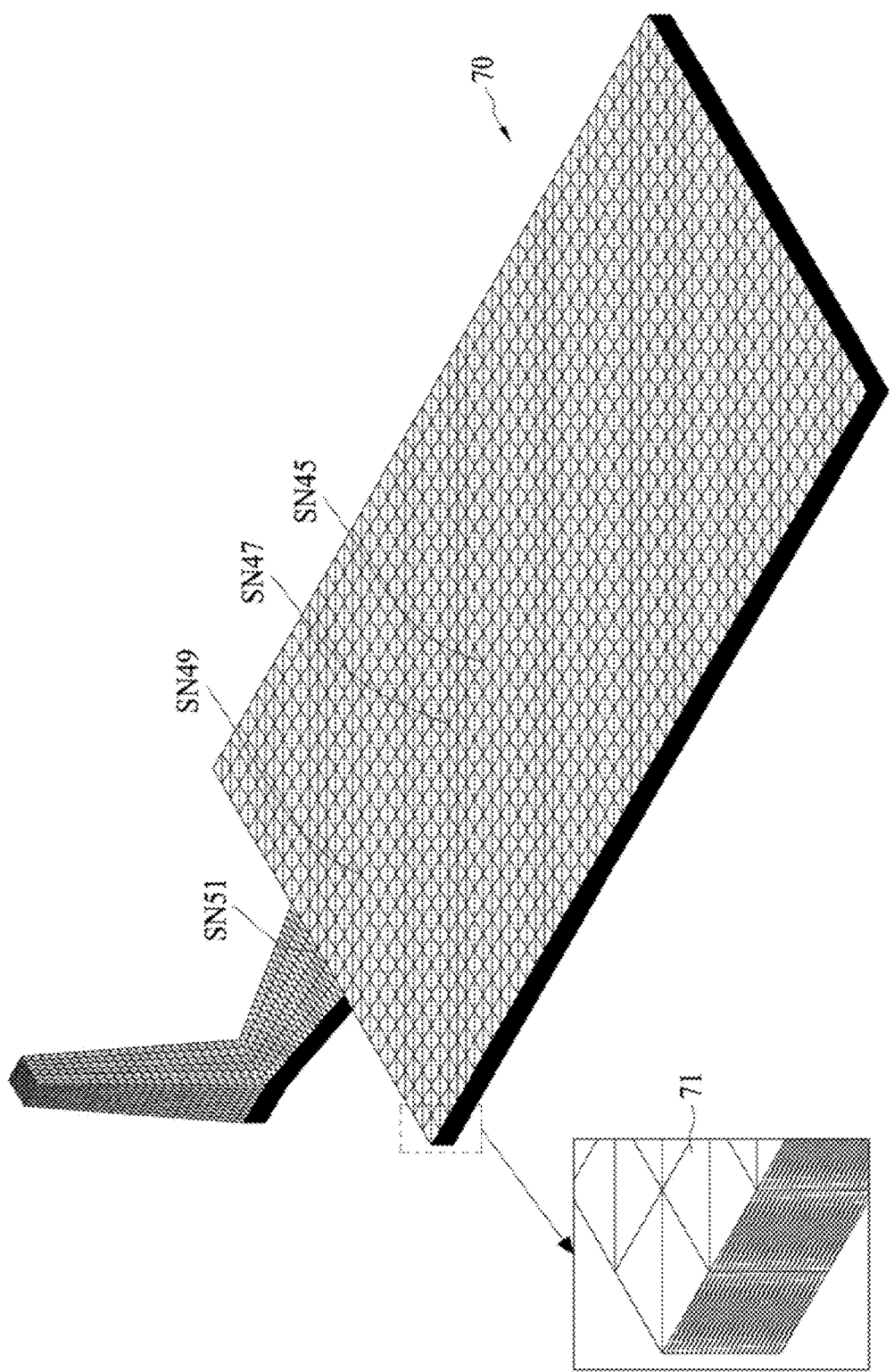
FIG. 6 is a schematic view of a simulated domain corresponding to the genuine domain in accordance with some embodiments of the present disclosure.

FIG. 5 is a schematic view of a genuine domain 60 in accordance with some embodiments of the present disclosure, and FIG. 6 is a schematic view of a simulated domain 70 corresponding to the genuine domain 60 in accordance with some embodiments of the present disclosure. Referring back to FIG. 2, the metal mold 20 may be divided into two parts: a metal part and space part defined by the metal part. The genuine domain 60 is an example of the space part of the metal mold 20. In some embodiments of the present disclosure, the simulated domain 70 is obtained from a CAD (Computer Aided Design) model used in design and development of a product.

In some embodiments of the present disclosure, a mesh is created by dividing at least part of the simulated domain 70 before actually applying a numerical analysis, such as an FEM (finite element method), an FDM (finite difference method) or an FVM (finite volume method), to the simulated domain 70. The creation of the mesh for the simulated domain 70 is a technique of modeling an object or fluid region (i.e., the simulated domain 70 of the present embodiment) to be analyzed with a set of elements 71, such as rectangular mesh, hexahedral mesh or tetrahedral mesh, in order to perform the in subsequent numerical analysis.

FIG. 7 shows a data sheet of the molding resin in accordance with some embodiments of the present disclosure. In some embodiments of the present disclosure, the molding resin is acrylonitrile butadiene styrene (ABS) resin having an ejection temperature of 99.85° C. and a freezing temperature of 119.85° C.

Figure 8:
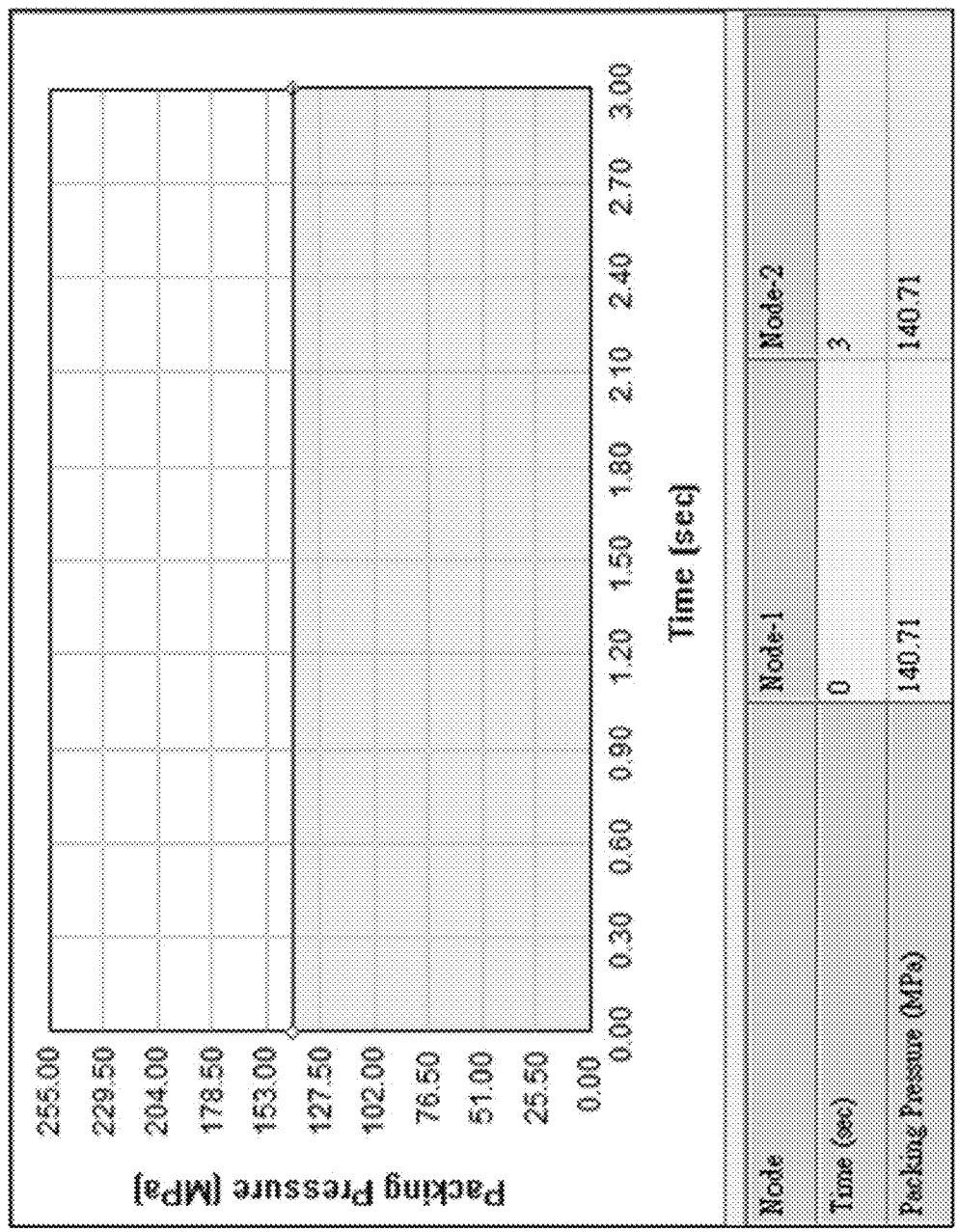
FIG. 8 is a schematic plot showing an initial setting packing pressure profile in accordance with some embodiments of the present disclosure.
Figure 9:
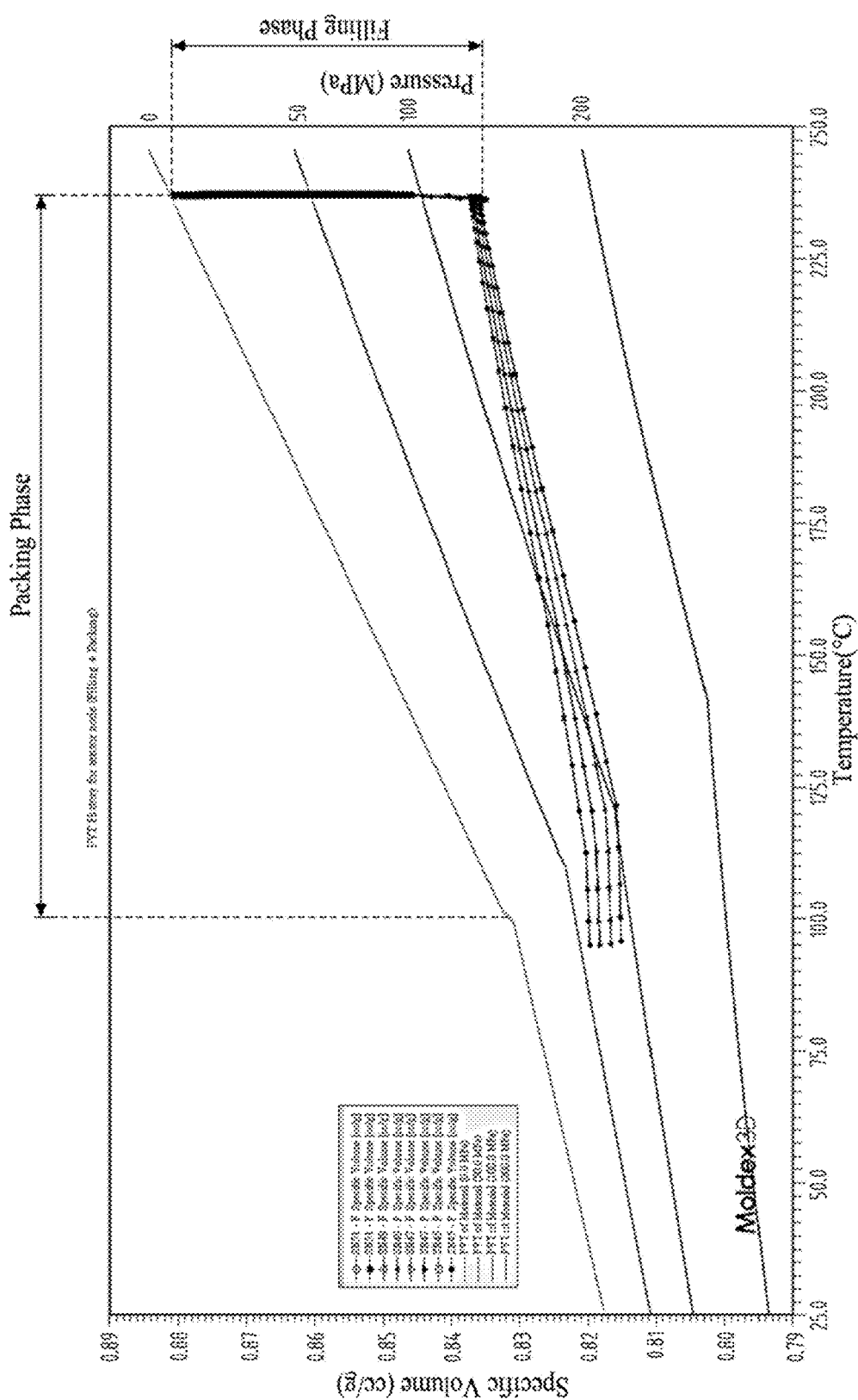
FIG. 9 and FIG. 10 are schematic plots showing a plurality of state waveforms at different sensing sites of the molding resin in the simulated domain using the initial setting packing pressure profile in FIG. 8 in accordance with some embodiments of the present disclosure.
Figure 10:
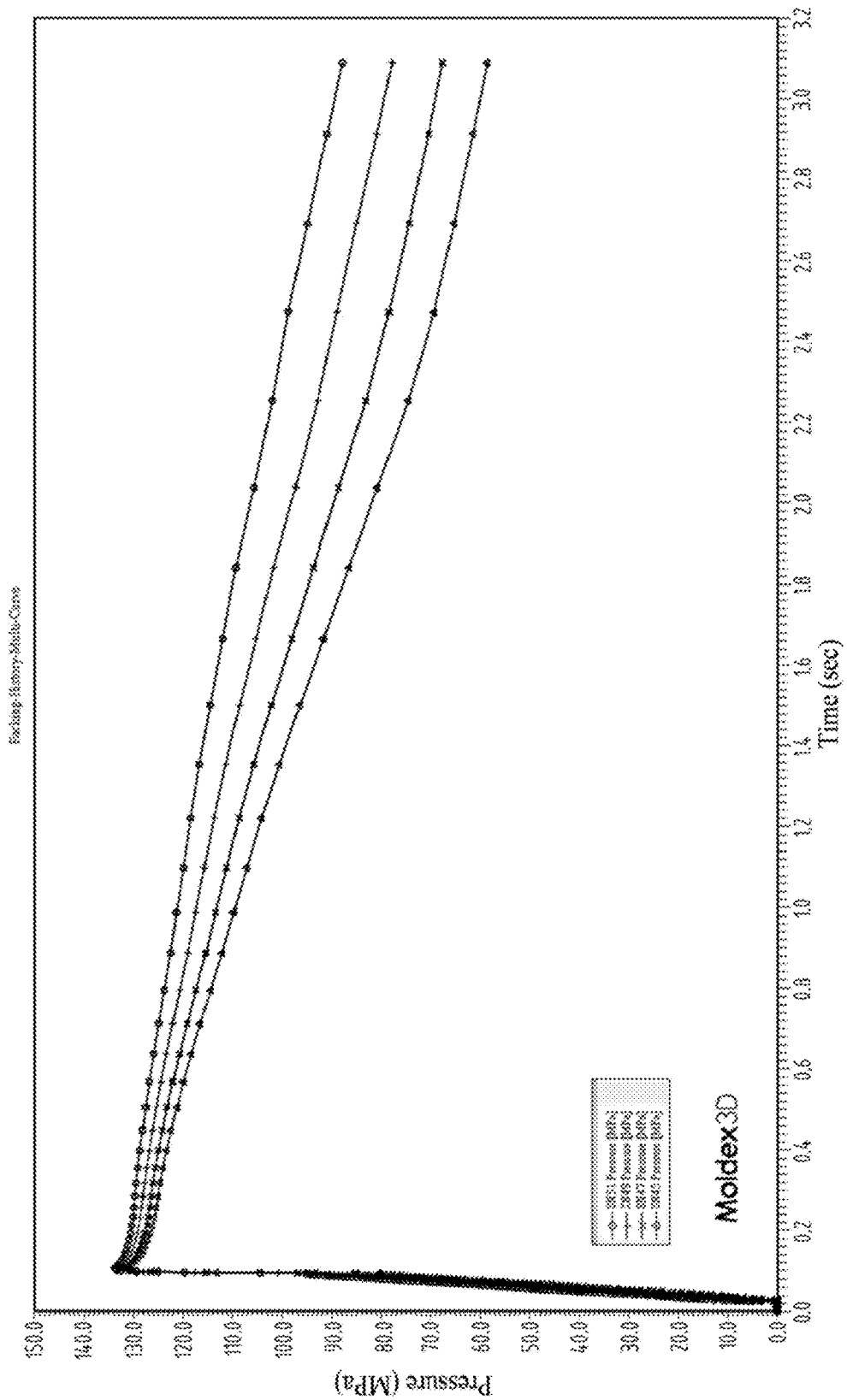

FIG. 8 is a schematic plot showing an initial setting packing pressure profile to be applied to at least a portion of the genuine domain 60 in accordance with some embodiments of the present disclosure. FIG. 9 and FIG. 10 are schematic plots showing a plurality of state waveforms at different sensing sites of the molding resin 16 in the simulated domain 70 using the initial setting packing pressure profile in FIG. 8 in accordance with some embodiments of the present disclosure. In some embodiments of the present disclosure, the method 30 can begin with step 31, where a first and a second state waveforms are generated using a setting packing pressure profile in FIG. 8. In some embodiments of the present disclosure, the state waveforms are generated by a virtual molding process as described below.

In some embodiments of the present disclosure, the virtual molding process includes performing a simulation process to simulate an injection molding process of a molding resin that is injected into the simulated domain 70, so as to generate the state waveforms expressing a relationship between an in-mold pressure, an in-mold temperature, and a specific volume of the molding resin. In some embodiments of the present disclosure, the simulation process uses the packing pressure profile for simulating the application of a packing pressure to the nozzle 29 of the genuine domain 60 by the screw 15 of the molding in machine. In some embodiments of the present disclosure, the packing pressure profile may be a single pressure value (e.g., the initial packing pressure, 140.71 MPa in FIG. 8), which can be an ending pressure of the filling stage.

In some embodiments of the present disclosure, the packing pressure profile may be a waveform with varying pressure values, which can be obtained from the injection molding machine 10 after a trial molding operation. In some embodiments of the present disclosure, the packing pressure profile may be a waveform with varying pressure values, which is obtained from a trial simulation process of the injection molding operation.

The molding phenomena of the molding resin 16 can be simulated by using the following governing equations (1)-(4):

$$\frac{\partial \rho}{\partial t} + \nabla \cdot \rho u = 0 \tag{1}$$

$$\frac{\partial}{\partial t}(\rho u) + \nabla \cdot (\rho u u + \tau) = -\nabla p + \rho g \tag{2}$$

$$\frac{\partial}{\partial t}(T \rho C_p) + \nabla \cdot (\rho u C_p T) = k \nabla^2 T + \eta \dot{\gamma}^2 \tag{3}$$

$$\tau = -\eta(T, \dot{\gamma}) \cdot (\nabla u + \nabla u^T) \tag{4}$$

where u represents the velocity vector (flow velocity), T represents the temperature, t represents the time, P represents the pressure, $\tau$ represents the total stress tensor, $\rho$ represents the density, $\eta$ represents the viscosity, k represents the thermal conductivity, $C_P$ represents the specific heat, and $\dot{\gamma}$ represents the shear rate.

In one embodiment of the present disclosure, the governing equations (1)-(4) are solved using the pressure of the packing pressure profile in FIG. 8 to set the boundary conditions of the governing equations (1)-(4) at the nozzle 29 of the genuine domain 60. Solving to the governing equations (1)-(4) requires the transient state analysis (virtual molding), which can be performed numerically using a computing apparatus. See, e.g., Rong-yeu Chang and Wen-hsien Yang, Numerical simulation of mold filling in injection molding using a three-dimensional finite volume approach, International Journal for Numerical Methods in Fluids Volume 37, Issue 2, pages 125-148, Sep. 30, 2001, the entirety of which is herein incorporated by reference. During the transient state analysis, the process variables that change with time are not zero; i.e., the partial derivatives ($\partial/\partial t$) in the governing equations (1)-(4) are not considered zero.

Figure 11:
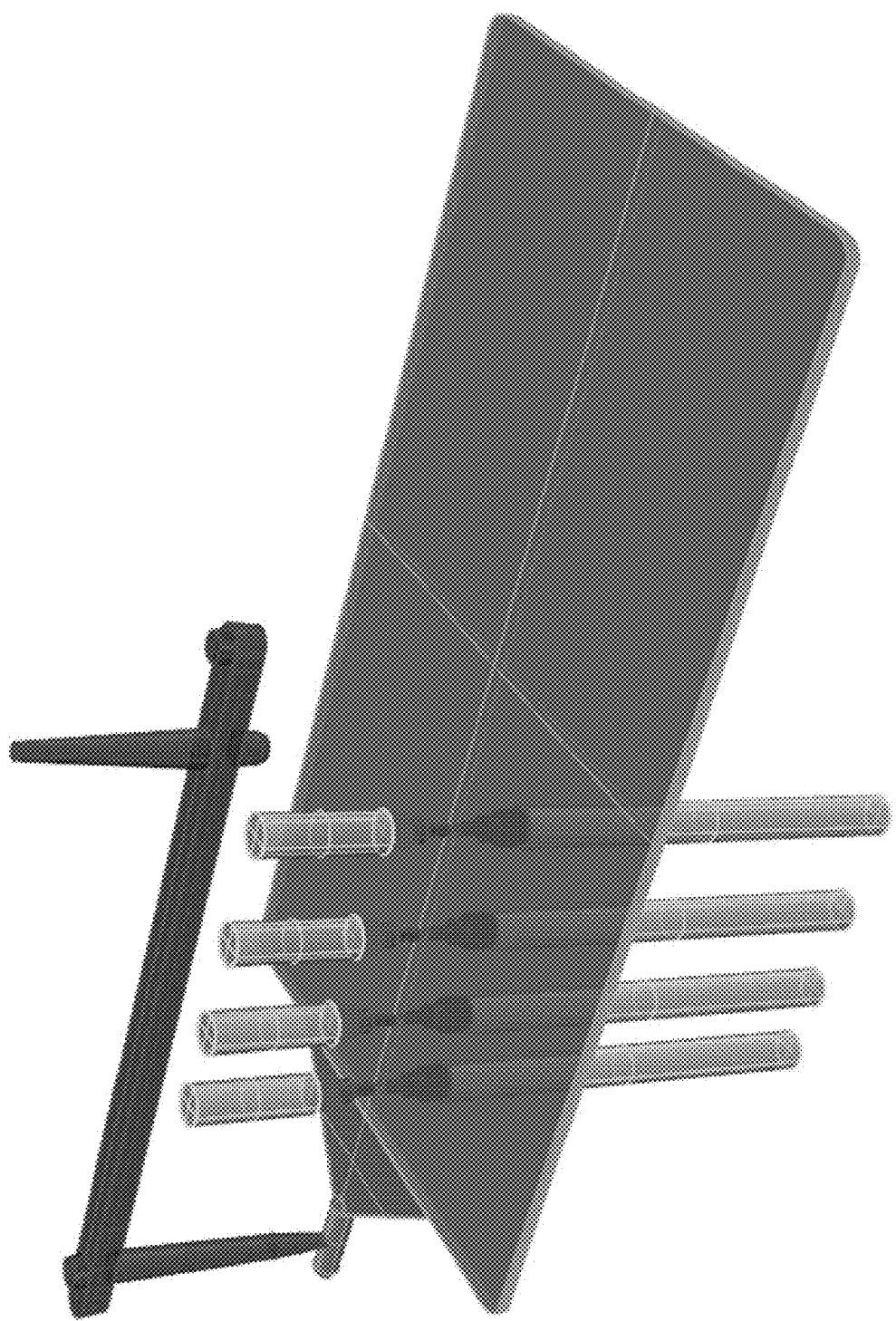
FIG. 11 is a schematic diagram showing a plurality of sensors (pressure sensors and temperature sensors) disposed at different sensing sites of the mold in accordance with some embodiments of the present disclosure.

FIG. 11 is a schematic diagram showing a plurality of sensors (pressure sensors and temperature sensors) disposed at different sensing sites of the mold in accordance with some embodiments of the present disclosure. In some embodiments of the present disclosure, instead of using the virtual molding process, the state waveforms FIG. 9 and FIG. 10 are generated by a plurality of sensors (pressure sensors and temperature sensors) disposed at different sensing sites of the mold.

In some embodiments of the present disclosure, the state waveforms express the relationship between the in-mold pressure (P), the in-mold specification volume (V), and the in-mold temperature (T) of the molding resin 16 at the plurality of sensing sites SN51, SN49, SN47, SN45 of the simulated domain 70 shown in FIG. 6. In some embodiments of the present disclosure, the state waveforms may optionally express the relationship between the in-mold pressure (P), the in-mold specification volume (V), and the in-mold temperature (T) of the molding resin 16 at any portion of the mold cavity 27.

Referring back to FIG. 9, in some embodiments of the present disclosure, each of the state waveforms includes a filling phase and a packing phase following the filling phase, and a transition node $T_t$ (e.g., before the packing phase right after the filling phase) between the filling phase and the packing phase. Referring back to FIG. 10, in some embodiments of the present disclosure, a maximum in-mold pressure of the state waveform (SN51) is larger than that of the other state waveforms (SN49, SN47, and SN45).

Figure 12:
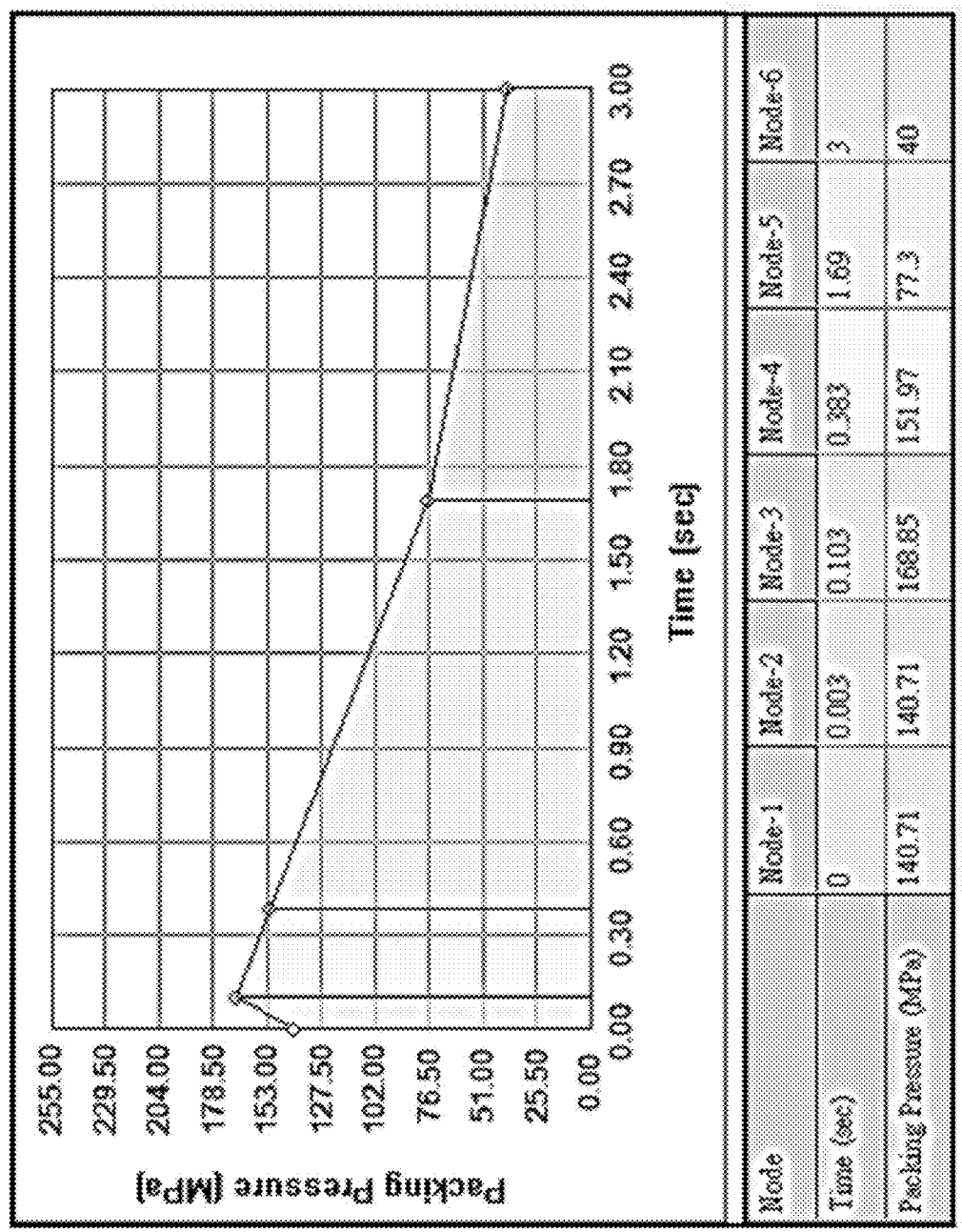
FIG. 12 is a schematic plot showing an updated packing pressure profile in accordance with some embodiments of the present disclosure.

FIG. 12 is a schematic plot showing an updated packing pressure profile in accordance with some embodiments of the present disclosure. In step 33 of the method 30 in FIG. 4, an updated packing pressure profile is obtained. In some embodiments of the present disclosure, the updated packing pressure profile includes a control node (Node-2), which is the initial control node of the packing phase; in addition, the updated packing pressure profile also includes a control node (Node-3) and a control node (Node-4) after the control node (Node-3), wherein the control node (Node-3) has a packing time at which the state waveform (SN51) substantially reaches the maximum in-mold pressure in FIG. 10. In some embodiments of the present disclosure, the control node (Node-3) has a packing pressure (e.g., 168.85 MPa), and the control node (Node-4) has a packing pressure (e.g., 151.97 MPa) smaller than the packing pressure of the control node (Node-3).

In some embodiments of the present disclosure, the initial packing pressure profile in FIG. 8 has an initial packing pressure (e.g., 140.71 MPa), and the computing apparatus is configured to obtain the packing pressure of the control node (Node-3) based on the initial packing pressure. In some embodiments of the present disclosure, the packing pressure of the control node (Node-3) is set by multiplying the initial packing pressure by a positive constant (e.g., 140.71*0.2=168.85 MPa), so as to apply a higher pressure to the molding resin in the mold cavity to reduce the deviation of the state waveforms when the state waveform (SN51) substantially reaches the maximum in-mold pressure in FIG. 10.

In some embodiments of the present disclosure, the updated packing pressure profile in FIG. 12 also includes a control node (Node-6) with a packing pressure, which is a designed ejection pressure (40 MPa) rather than the normal pressure. In some embodiments of the present disclosure, the updated packing pressure profile further includes a control node (Node-5), which functions as a buffering node between the control node (Node-4) and the control node (Node-6), and the packing time and the packing pressure of the third control node (Node-5) are designed to be the averages of those of the control node (Node-4) and the control node (Node-6).

Figure 13:
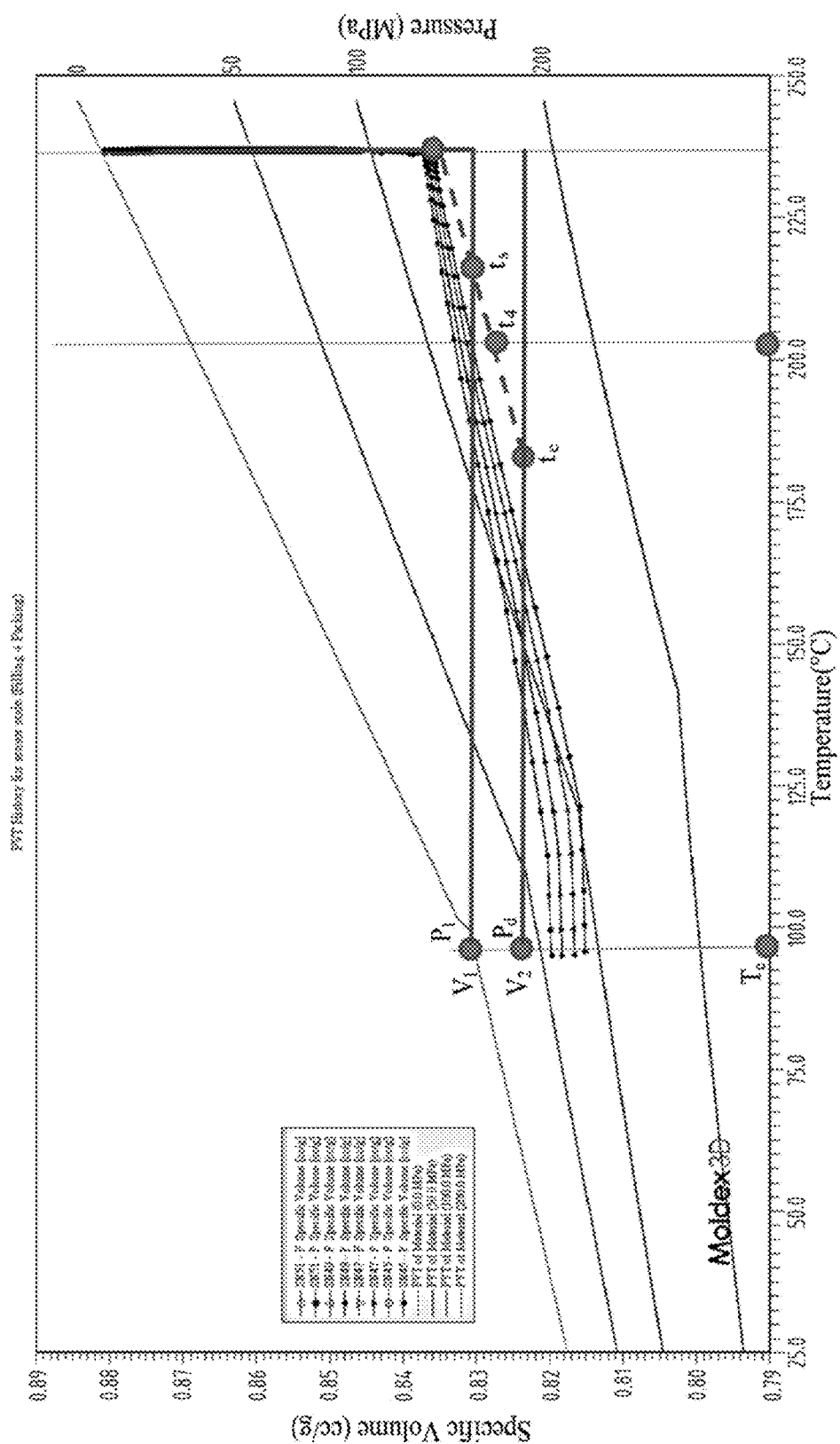
FIG. 13 is a schematic plot showing the setting of the control node (Node-4) in FIG. 12 in accordance with some embodiments of the present disclosure.

FIG. 13 is a schematic plot showing the setting of the control node (Node-4) in FIG. 12 in accordance with some embodiments of the present disclosure. In some embodiments of the present disclosure, the molding resin has a first specific volume ($V_1$) at a predetermined ejection temperature ($T_e$; e.g., 99.85° C. for the present embodiment) and a normal pressure ($P_0$), and a second specific volume ($V_2$) at the predetermined ejection temperature and a designed pressure ($P_d$); the control node (Node-4) has a packing time ($t_4$) between a starting time ($t_s$) and an ending time ($t_e$); the starting time ($t_s$) corresponds to a time at which the molding resin is isobarically cooled at the maximum in-mold pressure to reach the first specific volume ($V_1$); and the ending time ($t_e$) corresponds to a time at which the molding resin is isobarically cooled at the maximum in-mold pressure to reach the second specific volume ($V_2$). In some embodiments of the present disclosure, the computing apparatus is configured to obtain the packing pressure of the control node (Node-4) based on the packing pressure of the control node (Node-3), e.g., 168.85 MPa*0.9=151.97 MPa.

Figure 14:
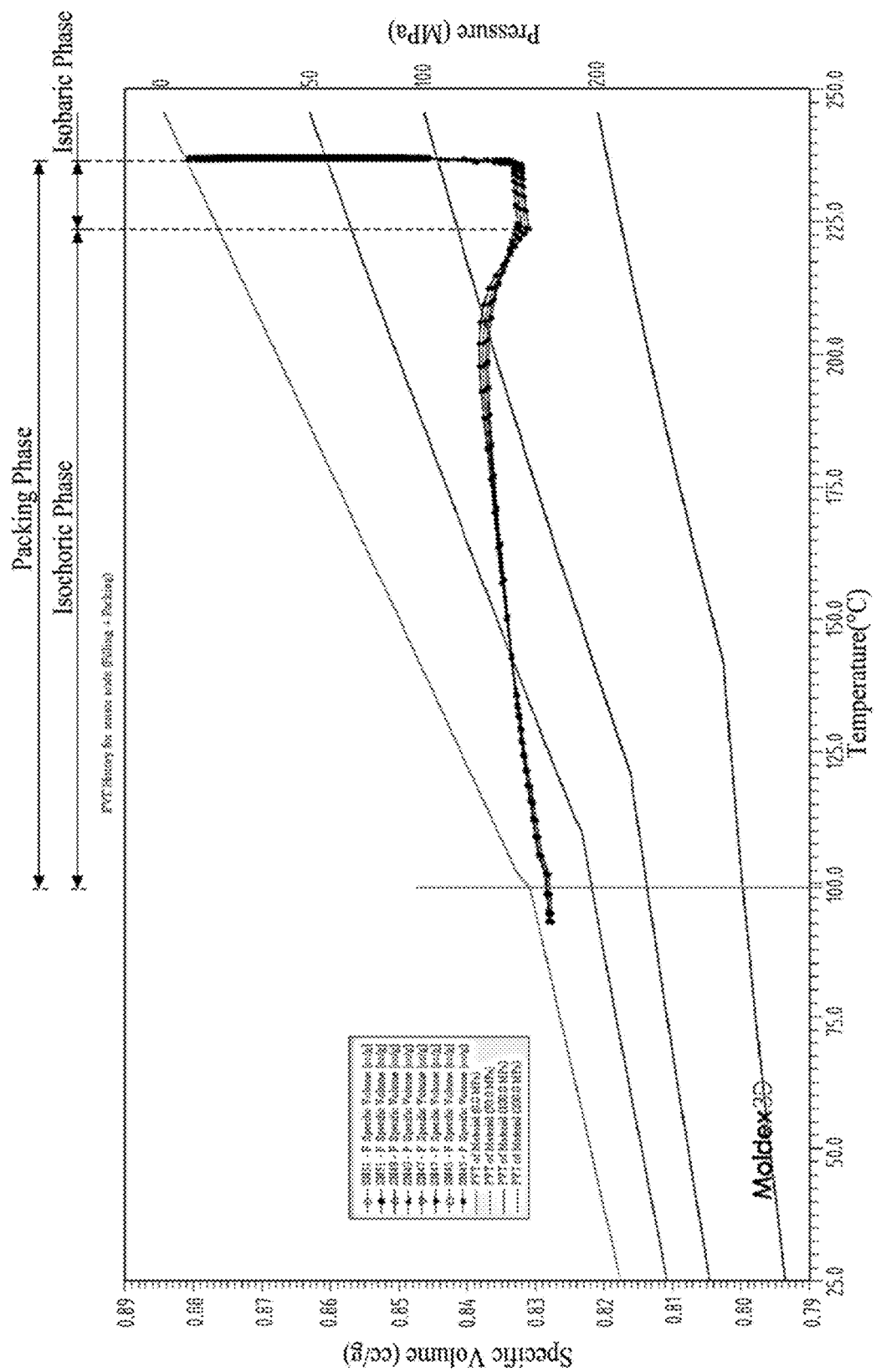
FIG. 14 and FIG. 15 are schematic plots showing a plurality of state waveforms at different sensing sites of the molding resin in the simulated domain using the updated packing pressure profile in FIG. 12 in accordance with some embodiments of the present disclosure.
Figure 15:
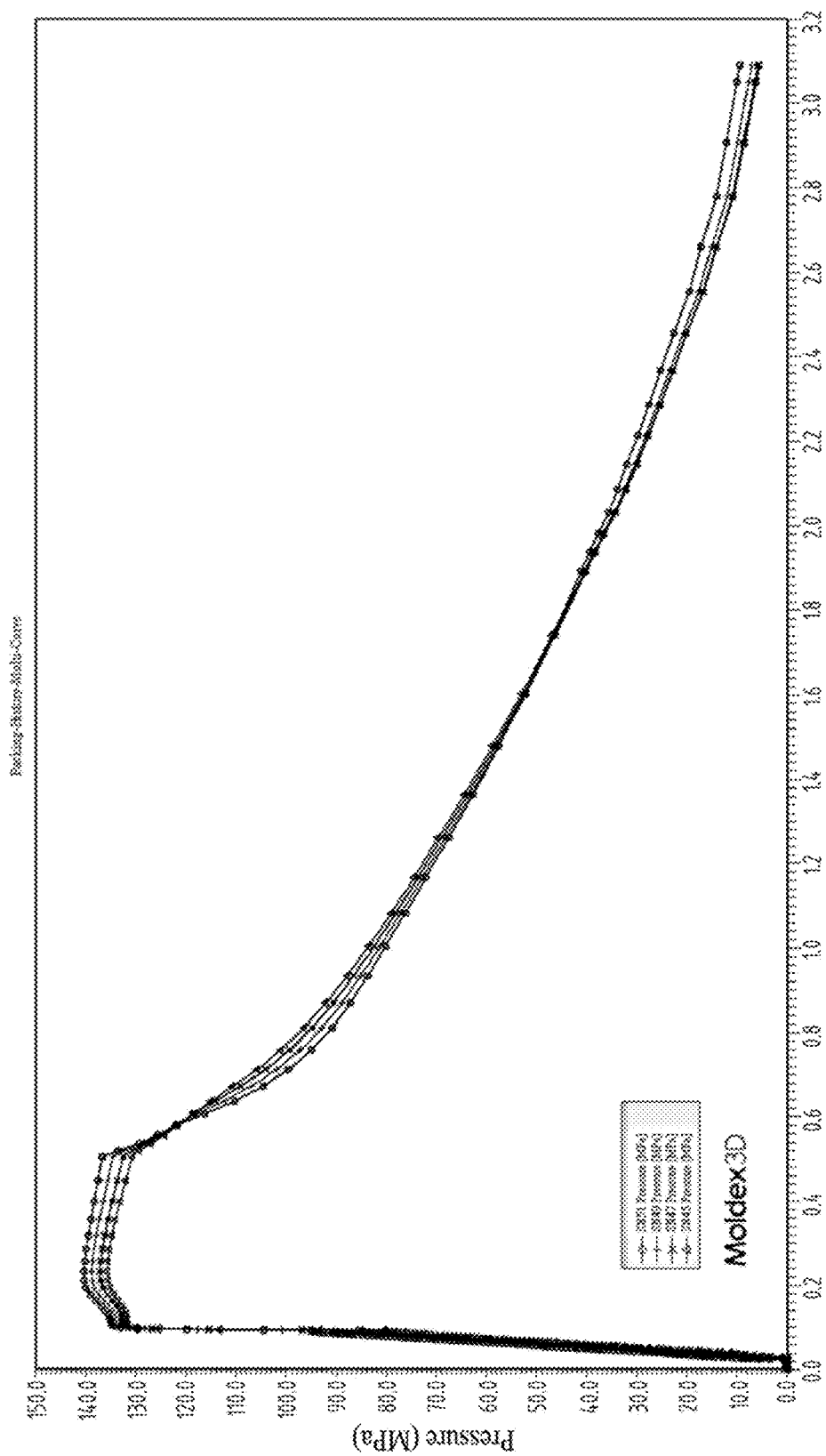

FIG. 14 and FIG. 15 are schematic plots showing a plurality of state waveforms at different sensing sites of the molding resin in the simulated domain 70 using the updated packing pressure profile in FIG. 12 in accordance with some embodiments of the present disclosure. Comparing FIG. 9 with FIG. 14, the updated packing pressure profile in FIG. 12 clearly changes the variation of the state waveforms. In some embodiments of the present disclosure, the updated packing pressure profile in FIG. 12 generates an isobaric phase and an isochoric phase following the isobaric phase in FIG. 14. Referring back to FIG. 14, the state waveforms deviate from each other in terms of the in-mold pressure at the predetermined ejection temperature ($T_e$; e.g., 99.85° C. for the present embodiment). In some embodiments of the present disclosure, the state waveform (SN45) has the smallest ejection pressure (11.94 MPa), which is still higher than a predetermined ejection pressure (Pe; e.g., 10 MPa). In other words, the packing pressure applied to the genuine domain 60 is too high and needs to be reduced to decrease the deviation ($\Delta P/Pe$) of the state waveforms.

Figure 16:
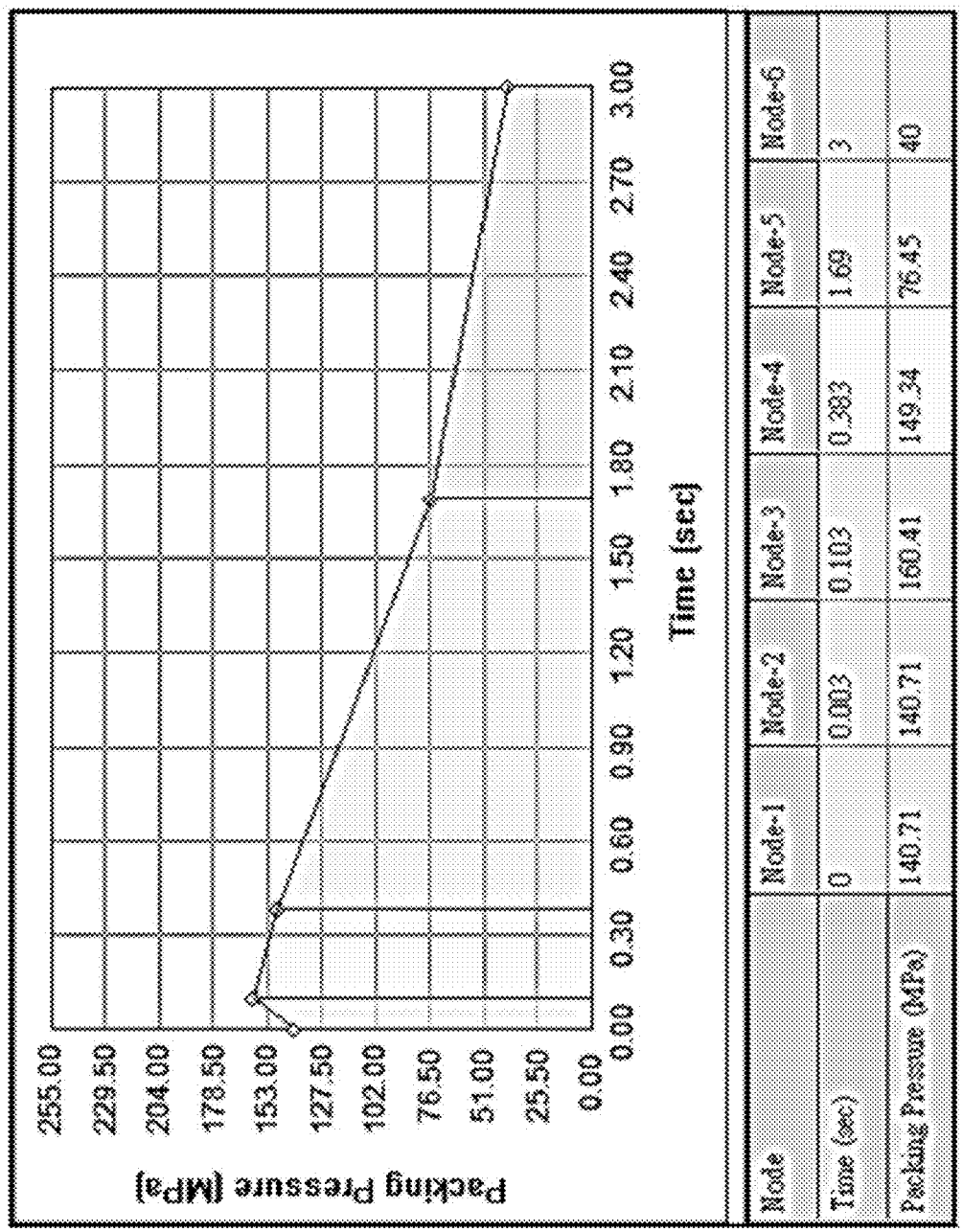
FIG. 16 is a schematic plot showing an updated packing pressure profile in accordance with some embodiments of the present disclosure.

FIG. 16 is a schematic plot showing an updated packing pressure profile in accordance with some embodiments of the present disclosure. In some embodiments of the present disclosure, the computing apparatus is configured to calculate a first pressure deviation between the ejection pressure of one state waveform and an expected ejection pressure (e.g., the predetermined ejection pressure, 10 MPa) and a second pressure deviation between the ejection pressure of another state waveform and the expected ejection pressure; the computing apparatus is also configured to adjust the packing pressure of the control node (Node-3) based on the first pressure deviation if the first pressure deviation is larger than the second pressure deviation. In some embodiments of the present disclosure, the packing pressure of the control node (Node-3) in FIG. 16 is reduced, e.g., by 5% to 160.41 MPa. In some embodiments of the present disclosure, the packing pressure of the control node (Node-4) is also reduced, e.g., by 5% to 149.34 MPa.

Figure 17:
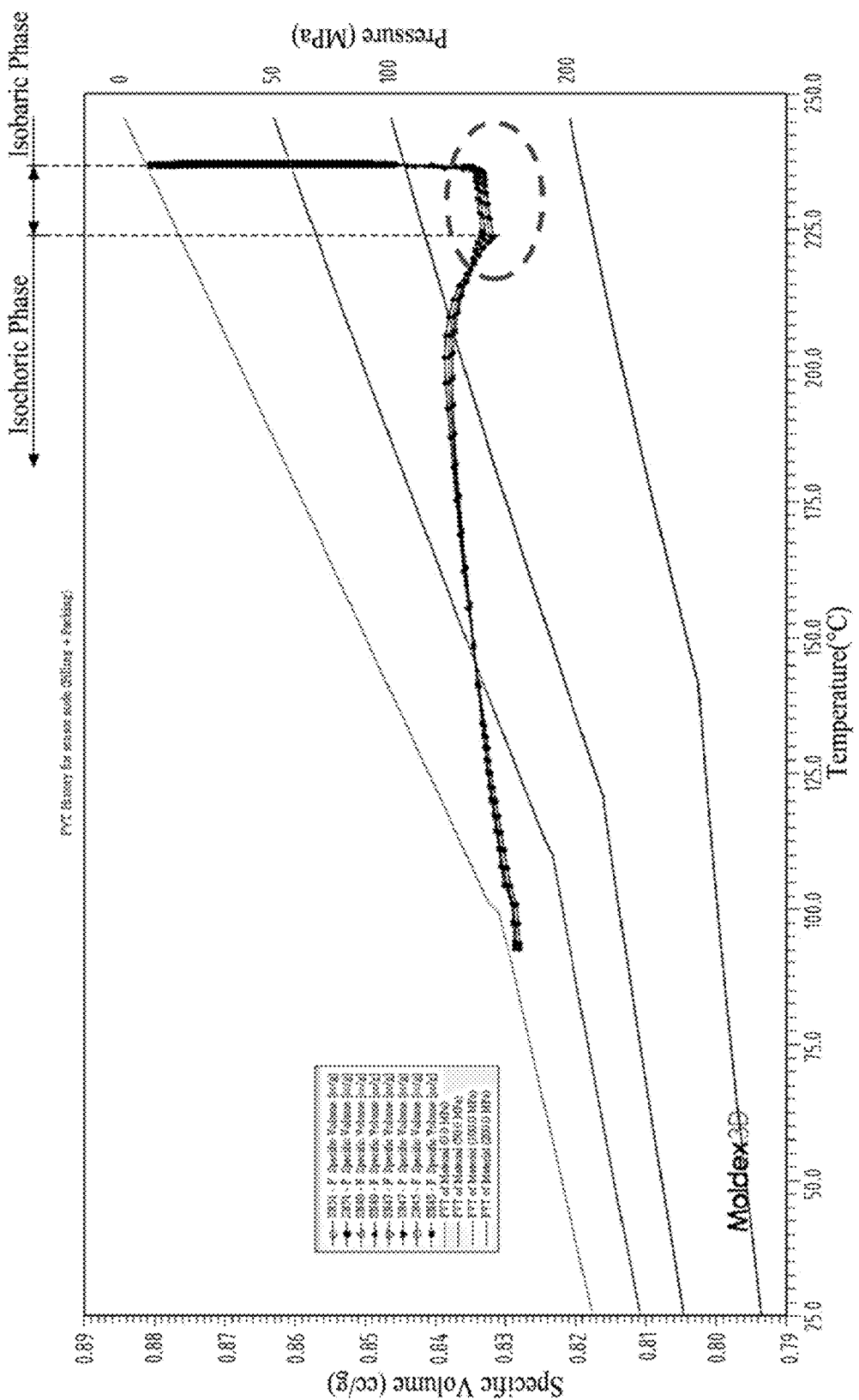
FIG. 17 is a schematic plot showing a plurality of state waveforms at different sensing sites of the molding resin in the simulated domain using the updated packing pressure profile in FIG. 16 in accordance with some embodiments of the present disclosure.

FIG. 17 is a schematic plot showing a plurality of state waveforms at different sensing sites of the molding resin in the simulated domain 70 using the updated packing pressure profile in FIG. 16 in accordance with some embodiments of the present disclosure. In actual molding, the in-mold pressure in the isobaric phase, indicated by a dashed line, is expected to be substantially constant, i.e., the variation shall be negligible. However, as the temperature declines, the in-mold pressure during the isobaric phase decreases. In other words, the packing pressure of the isobaric phase is too low to keep the in-mold pressure substantially constant as the in packing phase progresses from the control node (Node-3 with 160.41 MPa) through the control node (Node-4 with 149.34 MPa) to the control node (Node-5 with 76.45 MPa) in FIG. 16.

Figure 18:
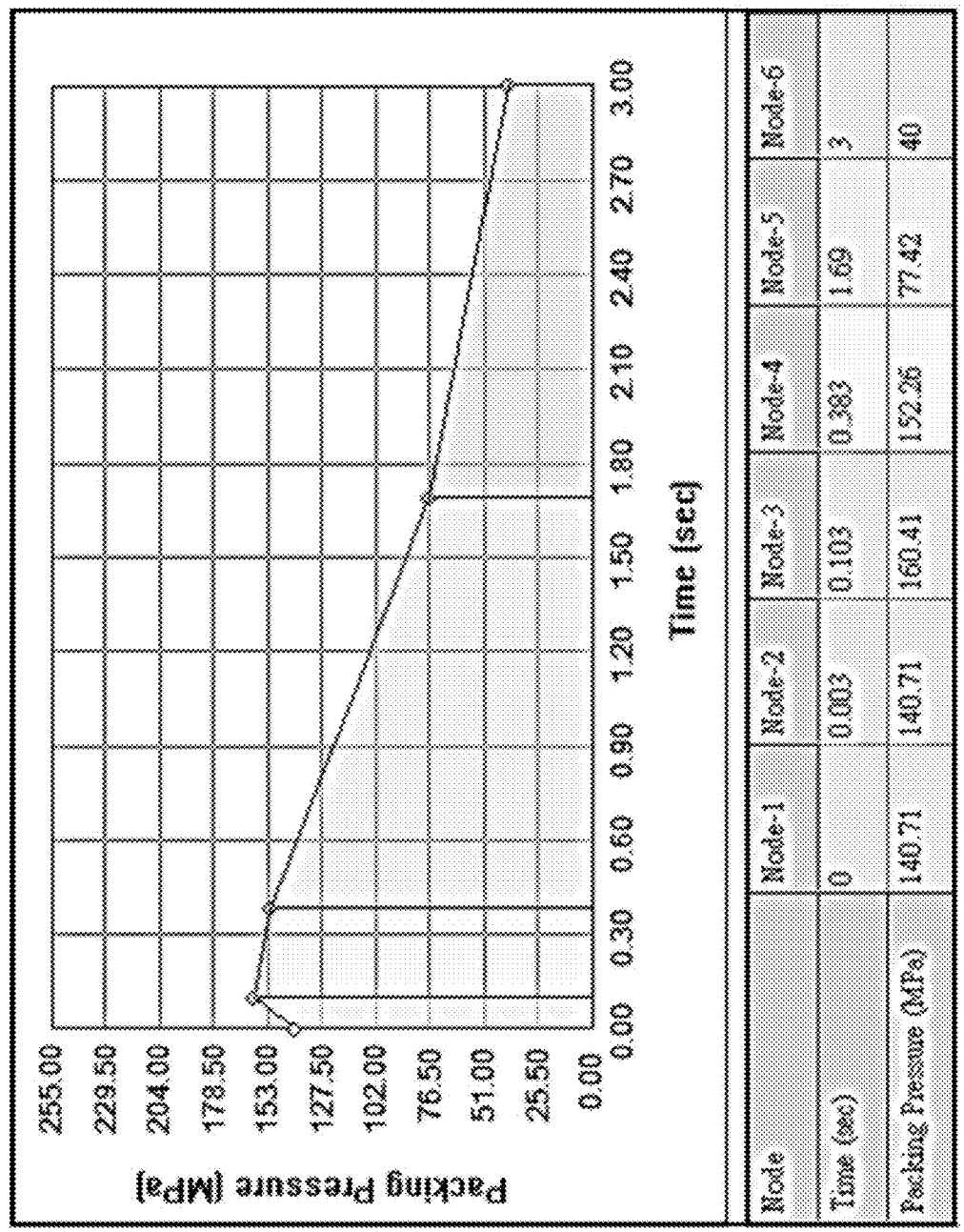
FIG. 18 is a schematic plot showing an updated packing pressure profile in accordance with some embodiments of the present disclosure.

FIG. 18 is a schematic plot showing an updated packing pressure profile in accordance with some embodiments of the present disclosure. In some embodiments of the present disclosure, the packing pressure (149.34 MPa) of the control node (Node-4) in FIG. 16 is increased to an increased packing pressure (152.26 MPa) in FIG. 18 to reduce the pressure difference between the control node (Node-3) and the control node (Node-4) so as to keep the in-mold pressure substantially constant during the isobaric phase. In some embodiments of the present disclosure, the packing pressure of the control node (Node-5) is also increased correspondingly.

Figure 19:
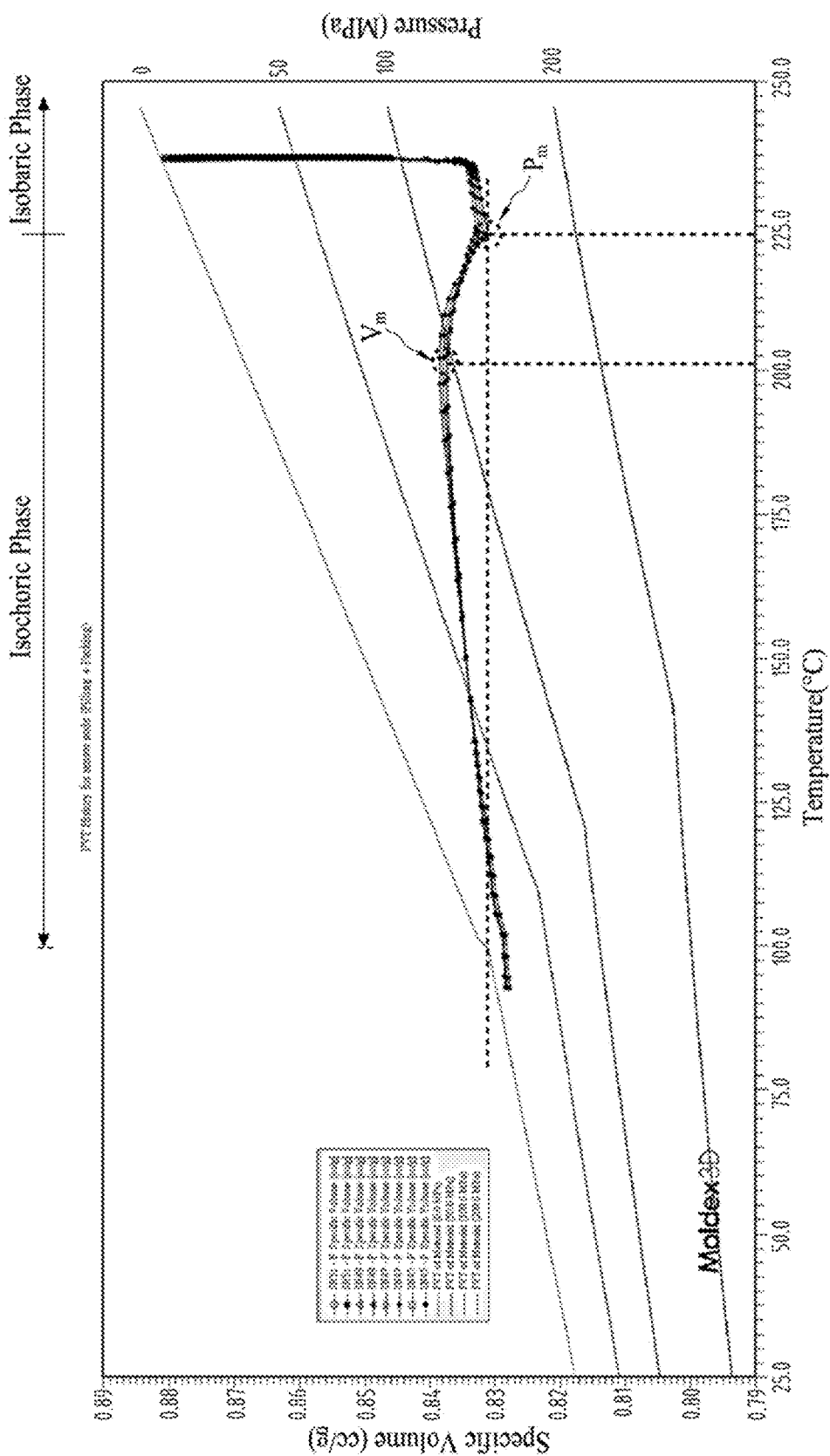
FIG. 19 is a schematic plot showing a plurality of state waveforms at different sensing sites of the molding resin in the simulated domain using the updated packing pressure profile in FIG. 18 in accordance with some embodiments of the present disclosure.

FIG. 19 is a schematic plot showing a plurality of state waveforms at different sensing sites of the molding resin in the simulated domain 70 using the updated packing pressure profile in FIG. 18 in accordance with some embodiments of the present disclosure. It is expected in actual molding that the in-mold specific volume in the isochoric phase is not larger than that in the isobaric phase. To meet this expectation, the packing pressure profile in FIG. 19 needs to be further updated, e.g., by adding a new control node having a packing time at which the state waveform substantially reaches a maximum in-mold specific volume ($V_m$) in order to increase the packing pressure so as to reduce the in-mold specific volume during the isochoric phase.

In some embodiments of the present disclosure, the state waveform substantially reaches the maximum in-mold specific volume ($V_m$=0.8383 cc/g) when the packing time is 0.802 second, which is set to be the packing time of the newly added control node; the corresponding in-mold temperature and in-mold pressure are 201.88° C. and 92.88 MPa, respectively. In some embodiments of the present disclosure, a designed pressure is obtained based on the in-mold temperature (e.g., 201.88° C.) at which the state waveform substantially reaches the maximum in-mold specific volume ($V_m$) and the in-mold specific volume (0.831 cc/g) at which the state waveform substantially reaches the maximum in-mold pressure ($P_m$), using a state model as follows:

| Modified Tait Model | variable | Value | unit |
|---|---|---|---|
| $V = V_0[1 - C\ln(1 + P/B)] + V_t$ | $b_{1L}$ | 0.832 | cc/g |
| | $b_{2L}$ | 0.000359 | cc/(g · K) |
| $V = \begin{cases} b_{1s} + b_{2s}T, \text{ if } T \leq T_t \\ b_{1L} + b_{2L}T, \text{ if } T > T_t \end{cases}$ | $b_{3L}$ | 2.98e+009 | dyne/cm² |
| | $b_{4L}$ | 0.00417 | 1/K |
| | $b_{1S}$ | 0.831 | cc/g |
| $B = \begin{cases} b_{3s}\exp(-b_{4s}T), \text{ if } T \leq T_t \\ b_{3L}\exp(-b_{4L}T), \text{ if } T \leq T_t \end{cases}$ | $b_{2S}$ | 0.00018 | cc/(g · K) |
| | $b_{3S}$ | 3.83e+009 | dyne/cm² |
| | $b_{4S}$ | 0.00395 | 1/K |
| $V_1 = \begin{cases} b_7\exp(b_8\bar{T} - b_9P), \text{ if } T \leq T_t \\ 0, \text{ if } T > T_t \end{cases}$ | $b_5$ | 373 | K |
| | $b_6$ | 2e-008 | cm² · K/(dyne) |
| | $b_7$ | 0 | cc/g |
| $\bar{T} = T - b_5$ | $b_8$ | 0 | 1/K |
| $T_1 = b_5 + b_6P$ | $b_9$ | 0 | cm²/(dyne) |
| C = 0.0894 | | | |

Figure 20:
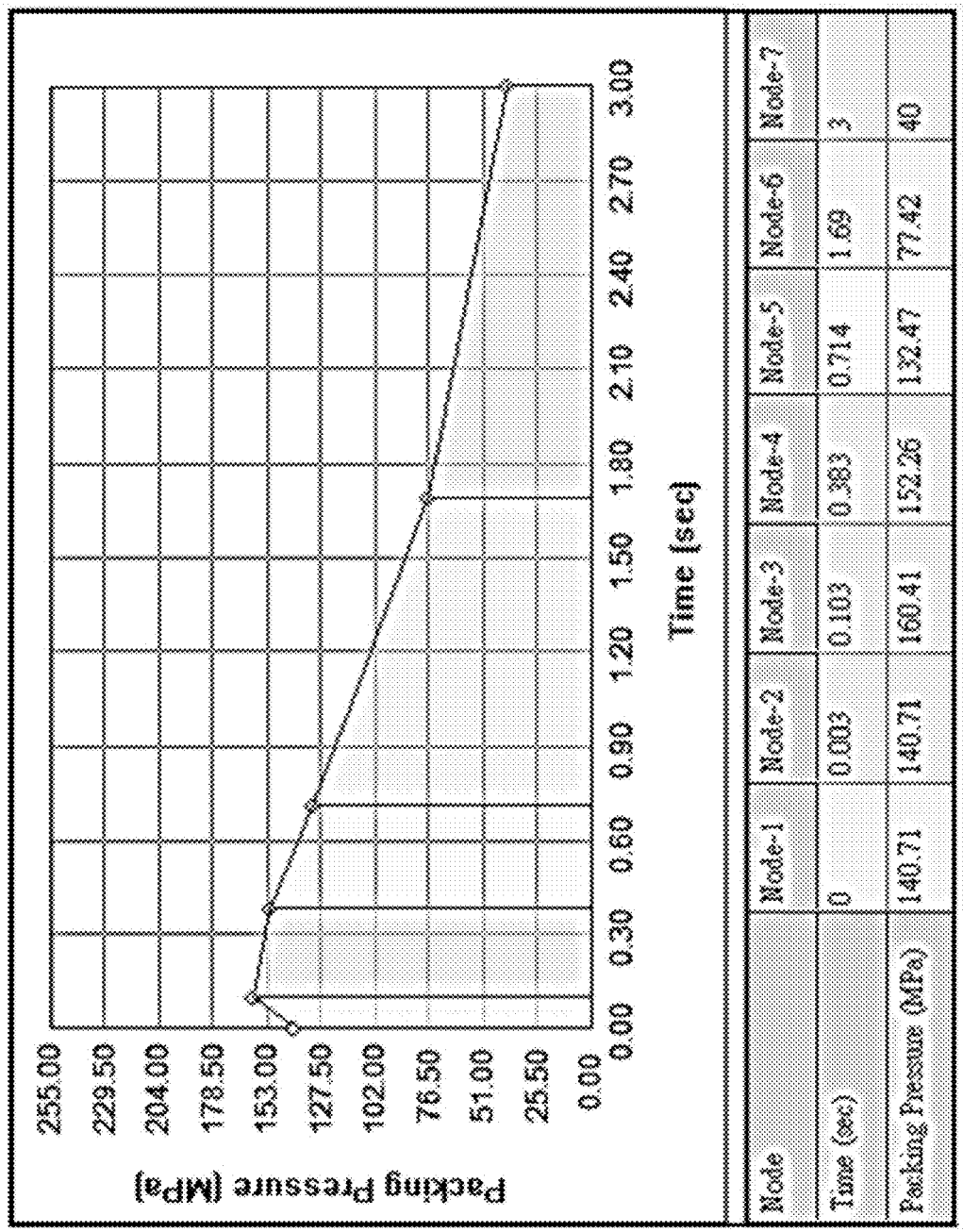
FIG. 20 is a schematic plot showing an updated packing pressure profile in accordance with some embodiments of the present disclosure.

FIG. 20 is a schematic plot showing an updated packing pressure profile in accordance with some embodiments of the present disclosure. In some embodiments of the present disclosure, compared with the packing pressure profile in FIG. 18, the updated packing pressure profile in FIG. 20 has the newly added control node (Node-5) after the control node (Node-4), wherein the control node (Node-5) and the control node (Node-6) in FIG. 18 are renamed to be the control node (Node-6) and the control node (Node-7) in FIG. 20. In some embodiments of the present disclosure, a plurality of control nodes may be added in the updated packing pressure profile to replace the newly added control node (Node-5), in order to increase the packing pressure so as to reduce the in-mold specific volume during the isochoric phase.

In some embodiments of the present disclosure, the new control node (Node-5) in FIG. 20 has the packing time at which one of the state waveform substantially reaches the maximum in-mold specific volume in FIG. 19, and the computing apparatus is configured to obtain the packing pressure of the new control node (node-5) based on the designed pressure and the maximum in-mold pressure. In some embodiments of the present disclosure, the packing pressure (P5) of the new control node (Node-5) is obtained using a formula (P5=P4*$P_d$/$P_m$), where $P_d$ is the designed packing pressure (e.g., Pd=121.1 MPa), $P_m$ is the maximum in-mold pressure (e.g., Pm=139.39 MPa), and P4 is the packing pressure of the control node (Node-4).

Figure 21:
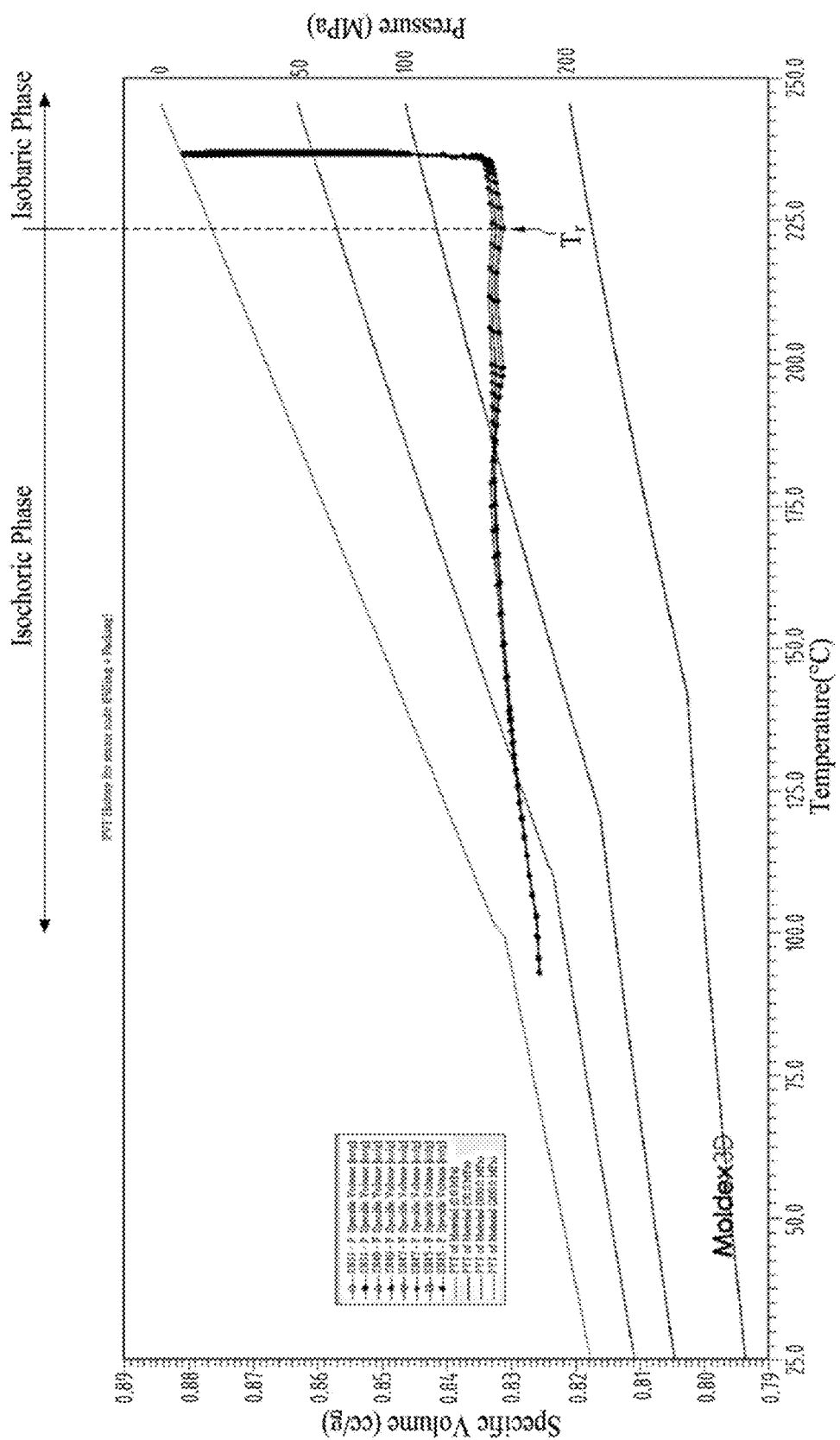
FIG. 21 is a schematic plot showing a plurality of state waveforms at different sensing sites of the molding resin in the simulated domain using the updated packing pressure profile in FIG. 20 in accordance with some embodiments of the present disclosure.

FIG. 21 is a schematic plot showing a plurality of state waveforms at different sensing sites of the molding resin in the simulated domain 70 using the updated packing pressure profile in FIG. 20 in accordance with some embodiments of the present disclosure. Comparing the state waveform in FIG. 19 with that in FIG. 21, it can be seen that the in-mold specific volume of the state waveform in FIG. 20 clearly decreases, which results in the newly added control node (Node-5) in FIG. 20. In some embodiments of the present disclosure, the state waveform in FIG. 21 includes an isobaric phase and an isochoric phase following the isobaric phase, and the packing time of the control node (Node-3) in FIG. 21 corresponds to the transition ($T_r$) between the isobaric phase and the isochoric phase.

In some embodiments of the present disclosure, in step 35 of the method 30 in FIG. 4, the molding machine is set based on the updated packing pressure profile in FIG. 20 to perform an actual molding process to prepare the molding product, and the state (PVT) variation of the molding resin is substantially the same as that shown in FIG. 21. In some embodiments of the present disclosure, referring back to FIG. 1 and FIG. 2, the updated packing pressure profile in FIG. 21 is used to set the screw-driving motor 12 of the molding machine 10 to apply the packing pressure to the sprue portion 21 of the metal mold 20 so as to perform an actual molding process to prepare the molding product.

Figure 22:
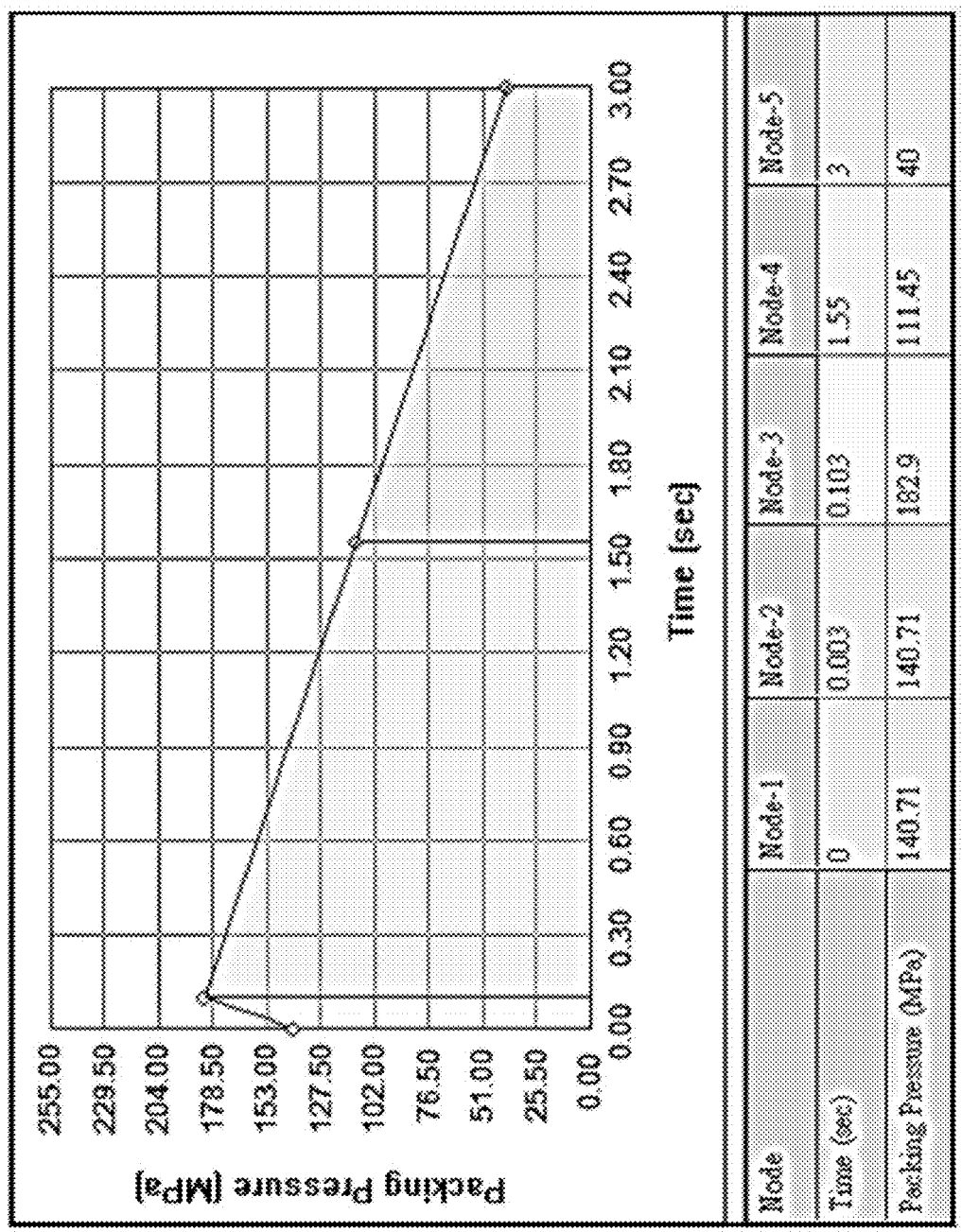
FIG. 22 and FIG. 23 are schematic plots showing a packing pressure profile and an updated packing pressure profile in accordance with some embodiments of the present disclosure.
Figure 23:
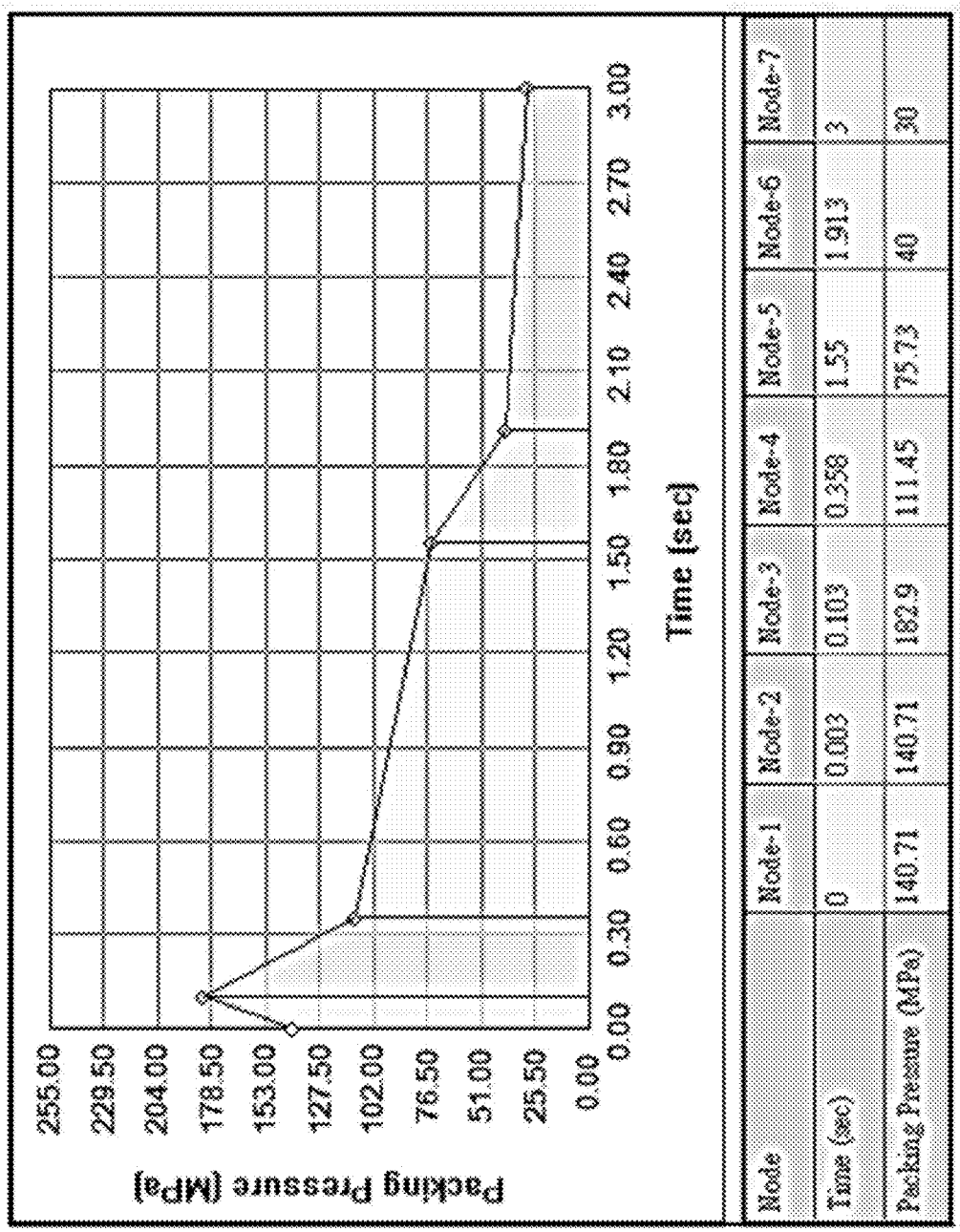

FIG. 22 and FIG. 23 are schematic plots showing a packing pressure profile and an updated packing pressure profile in accordance with some embodiments of the present disclosure. In some embodiments of the present disclosure, it is expected in actual molding that the molding resin is not transferred from the molding machine into the mold cavity after the state waveform substantially reaches the maximum in-mold pressure, so as to prevent the molding resin from flowing out of the mold cavity to the outside through the interface of the fixed-side metal mold 20A and the movable-side metal mold 20B. In some embodiments of the present disclosure, the computing in apparatus is configured to add at least one control node in the updated packing pressure profile if the molding resin is transferred from the molding machine into the mold cavity after the state waveform substantially reaches the maximum in-mold pressure.

In some embodiments of the present disclosure, solving the governing equations (1)-(4) obtains the flow velocity of the molding resin. It can then be seen whether the molding resin is transferred from the molding machine into the mold cavity after the first state waveform substantially reaches the maximum in-mold pressure.

Referring to FIG. 22, assuming the packing pressure profile in FIG. 22 results in transferring of the molding resin from the molding machine into the mold cavity at packing times (0.358 second and 1.913 second) after the state waveform substantially reaches the maximum in-mold pressure, the computing apparatus is configured to add two control nodes (Node-5 and Node-6 at 0.358 second and 1.913 seconds, respectively) in the updated packing pressure profile in FIG. 23; in addition, the control node (Node-5) in FIG. 22 is renamed as the control node (Node-7) with a reduced packing pressure in FIG. 23.

Figure 24:
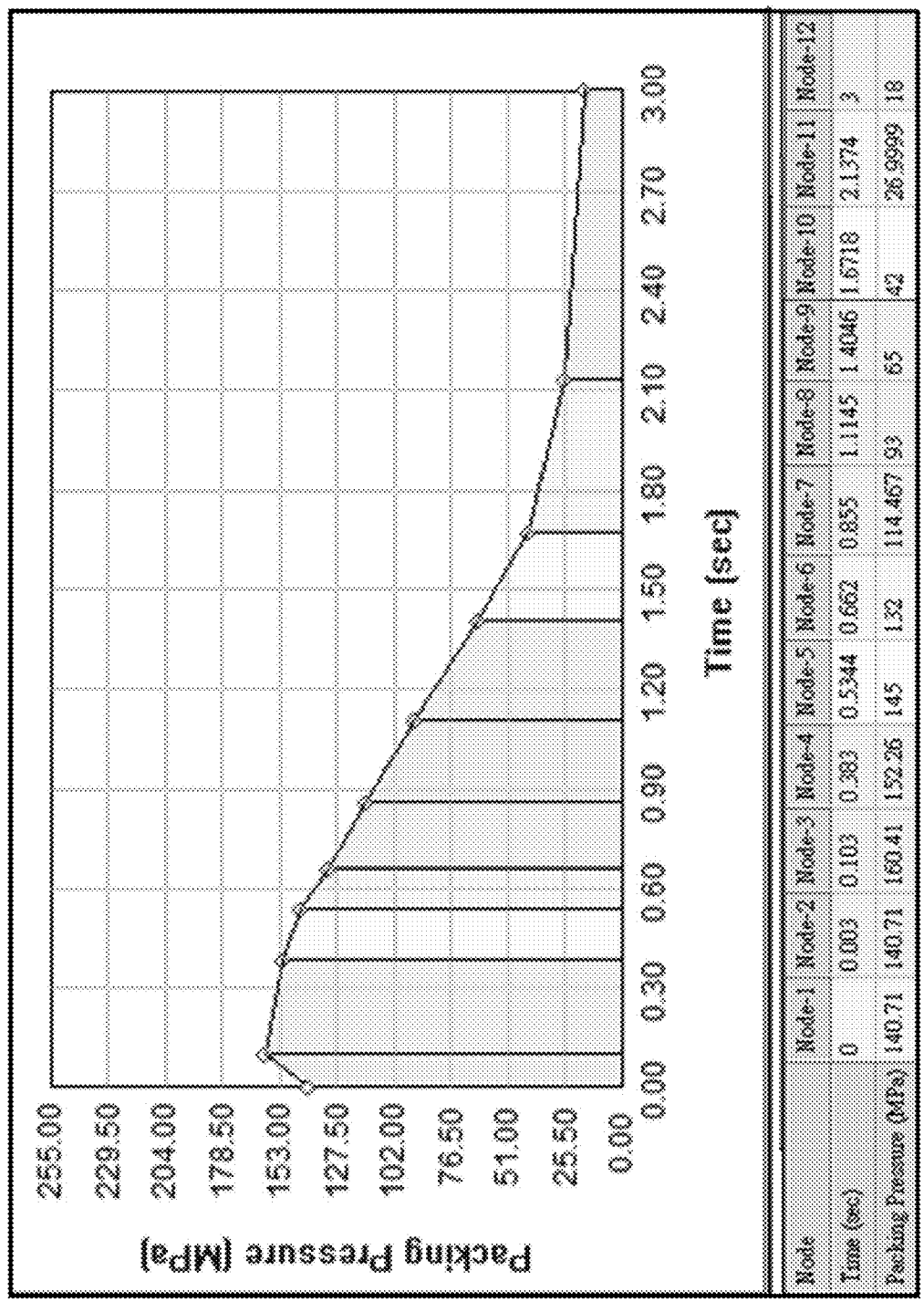
FIG. 24 is a schematic plot showing a packing pressure profile in accordance with some embodiments of the present disclosure.
Figure 25:
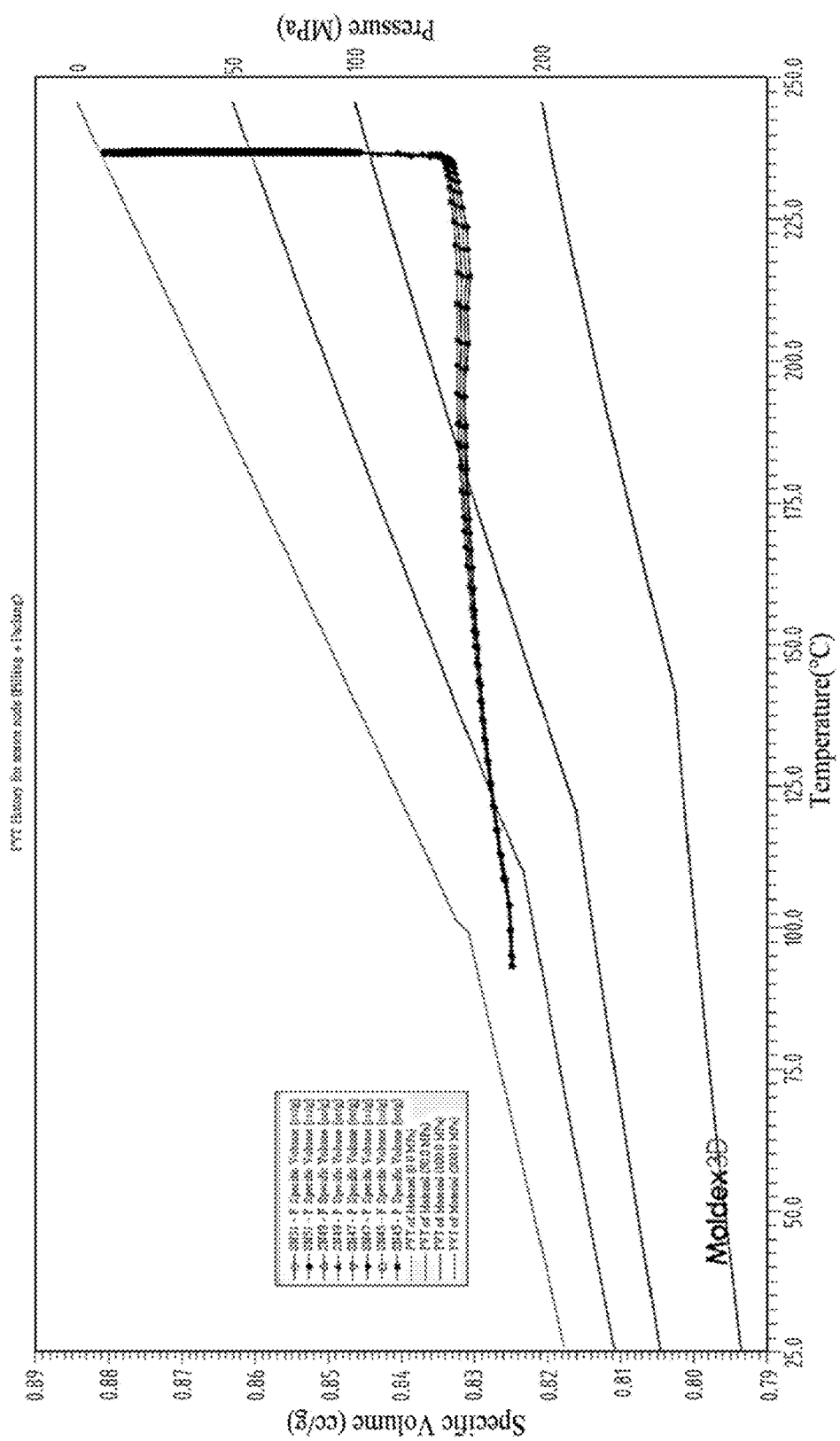
FIG. 25 is a schematic plot showing a plurality of state waveforms at different sensing sites of the molding resin in the simulated domain using the updated packing pressure profile in FIG. 24 in accordance with some embodiments of the present disclosure.

FIG. 24 is a schematic plot showing a packing pressure profile in accordance with some embodiments of the present disclosure, and FIG. 25 is a schematic plot showing a plurality of state waveforms at different sensing sites of the molding resin in the simulated domain 70 using the updated packing pressure profile in FIG. 24 in accordance with some embodiments of the present disclosure. The ejection pressure (specific volume) at the ejection temperature ($T_e$; e.g., 99.85° C. for the present embodiment) in FIG. 23 can be obtained either by the virtual molding or actual measurement (e.g., about 26.96 MPa in and 0.8248 cc/g, respectively).

Figure 26:
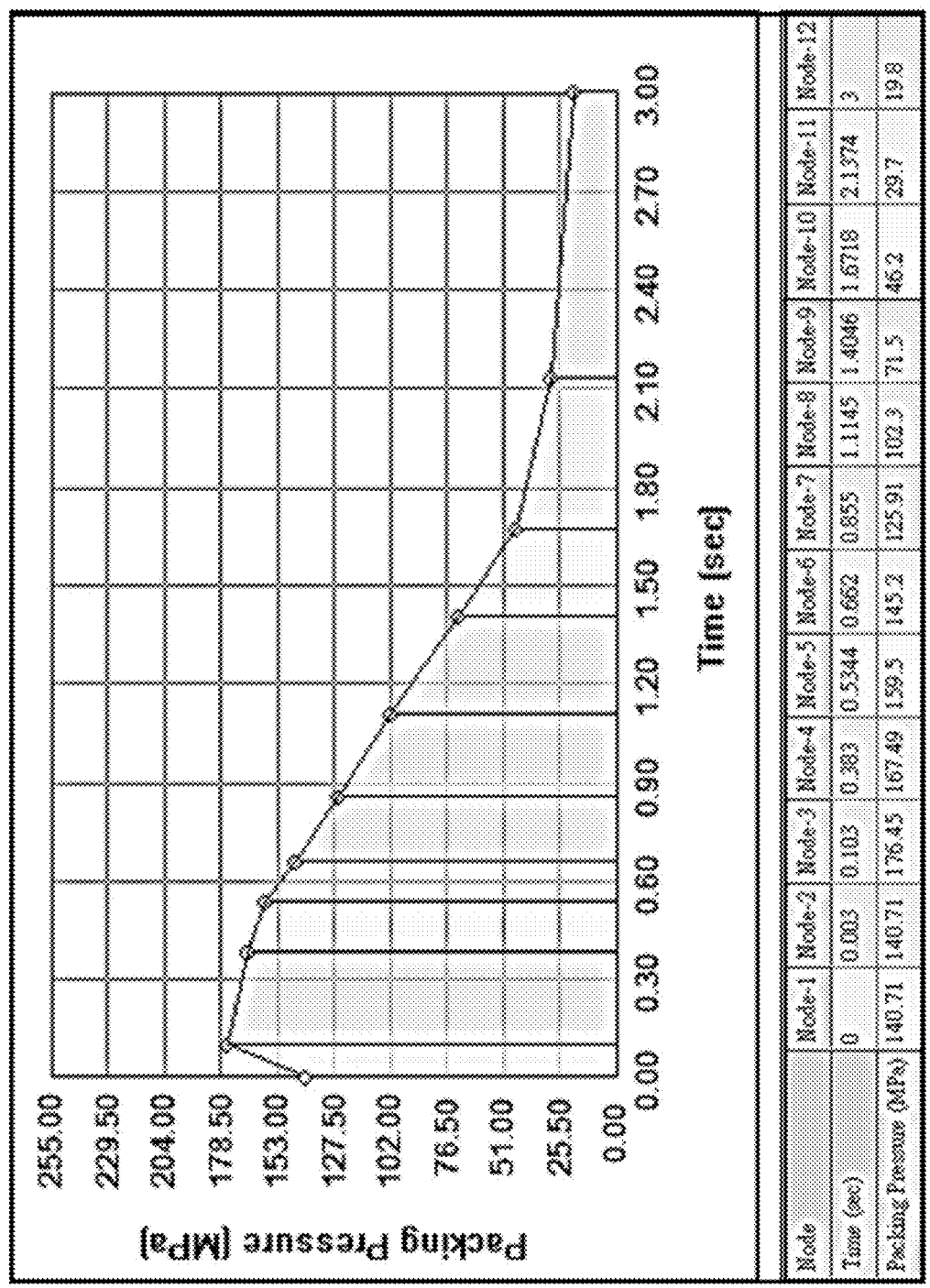
FIG. 26 is a schematic plot showing a packing pressure profile in accordance with some embodiments of the present disclosure.
Figure 27:
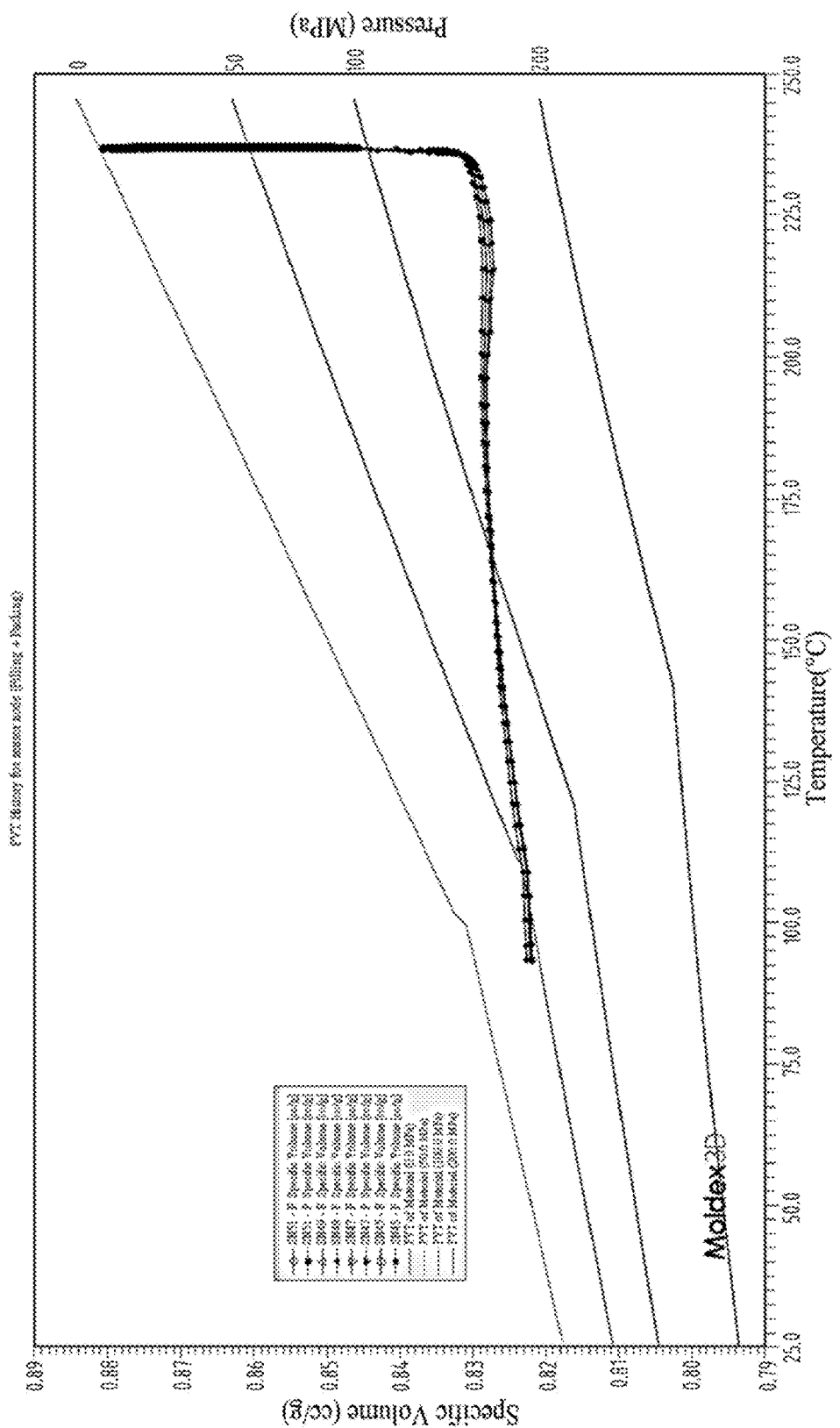
FIG. 27 is a schematic plot showing a plurality of state waveforms at different sensing sites of the molding resin in the simulated domain using the updated packing pressure profile in FIG. 26 in accordance with some embodiments of the present disclosure.

FIG. 26 is a schematic plot showing a packing pressure profile in accordance with some embodiments of the present disclosure, and FIG. 27 is a schematic plot showing a plurality of state waveforms at different sensing sites of the molding resin in the simulated domain 70 using the updated packing pressure profile in FIG. 26 in accordance with some embodiments of the present disclosure. In some embodiments of the present disclosure, the computing apparatus is configured to change the packing pressure profile in FIG. 24 by multiplying the packing pressures by a constant value so as to obtain the updated packing pressure profile in FIG. 26 for changing an ejection pressure of the molding product. In some embodiments of the present disclosure, the computing apparatus multiplies the packing pressures of the control nodes (except the Node-1) with a constant value (e.g., 1.1) to obtain the updated packing pressure profile in FIG. 26. Comparing FIG. 25 and FIG. 27, it is clear that the ejection pressure and specific volume at the ejection temperature ($T_e$; e.g., 99.85° C. for the present embodiment) is changed (e.g., 42.6 MPa and 0.8222 cc/g).

Figure 28:
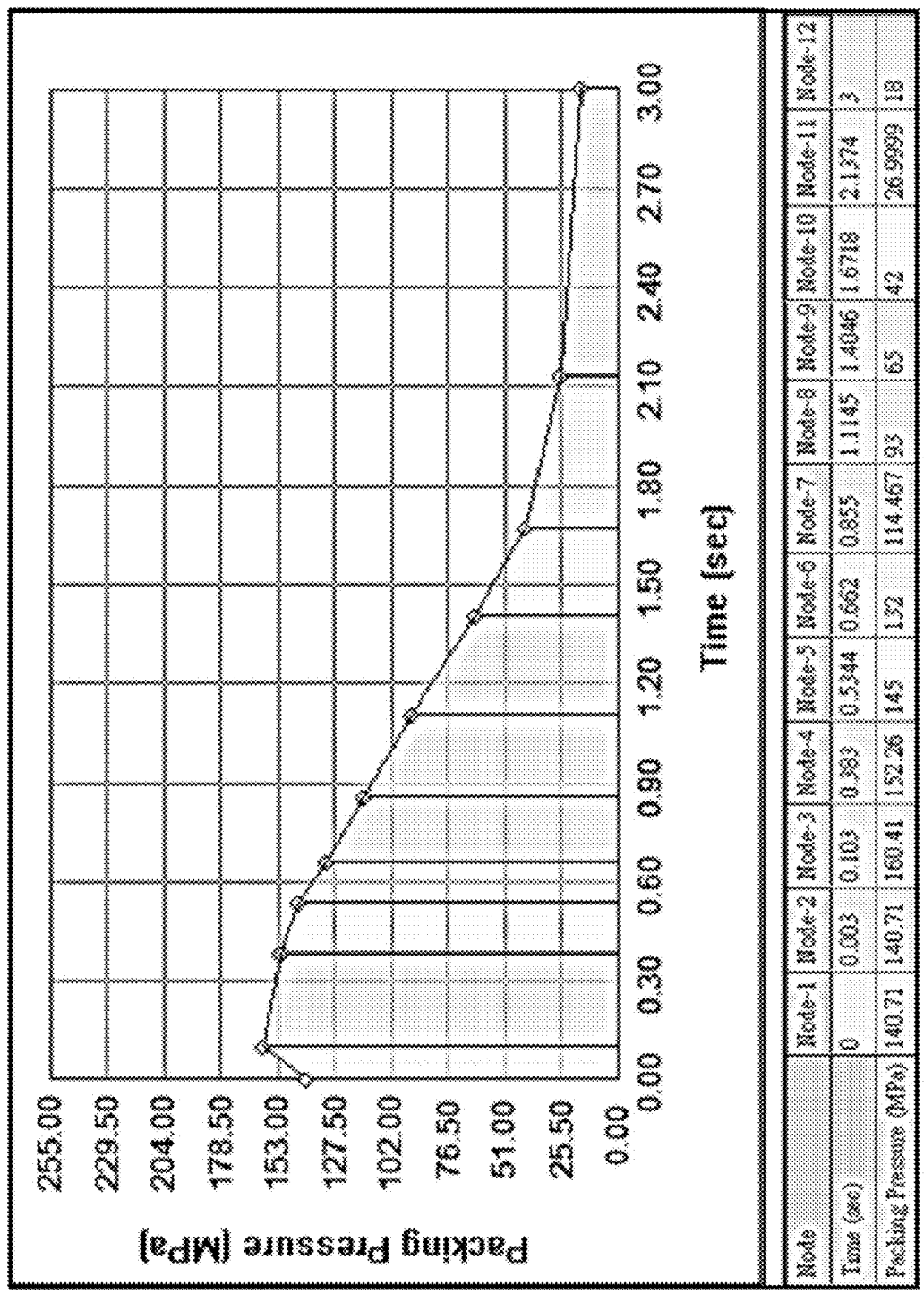
FIG. 28 is a schematic plot showing a packing pressure profile in accordance with some embodiments of the present disclosure.
Figure 29:
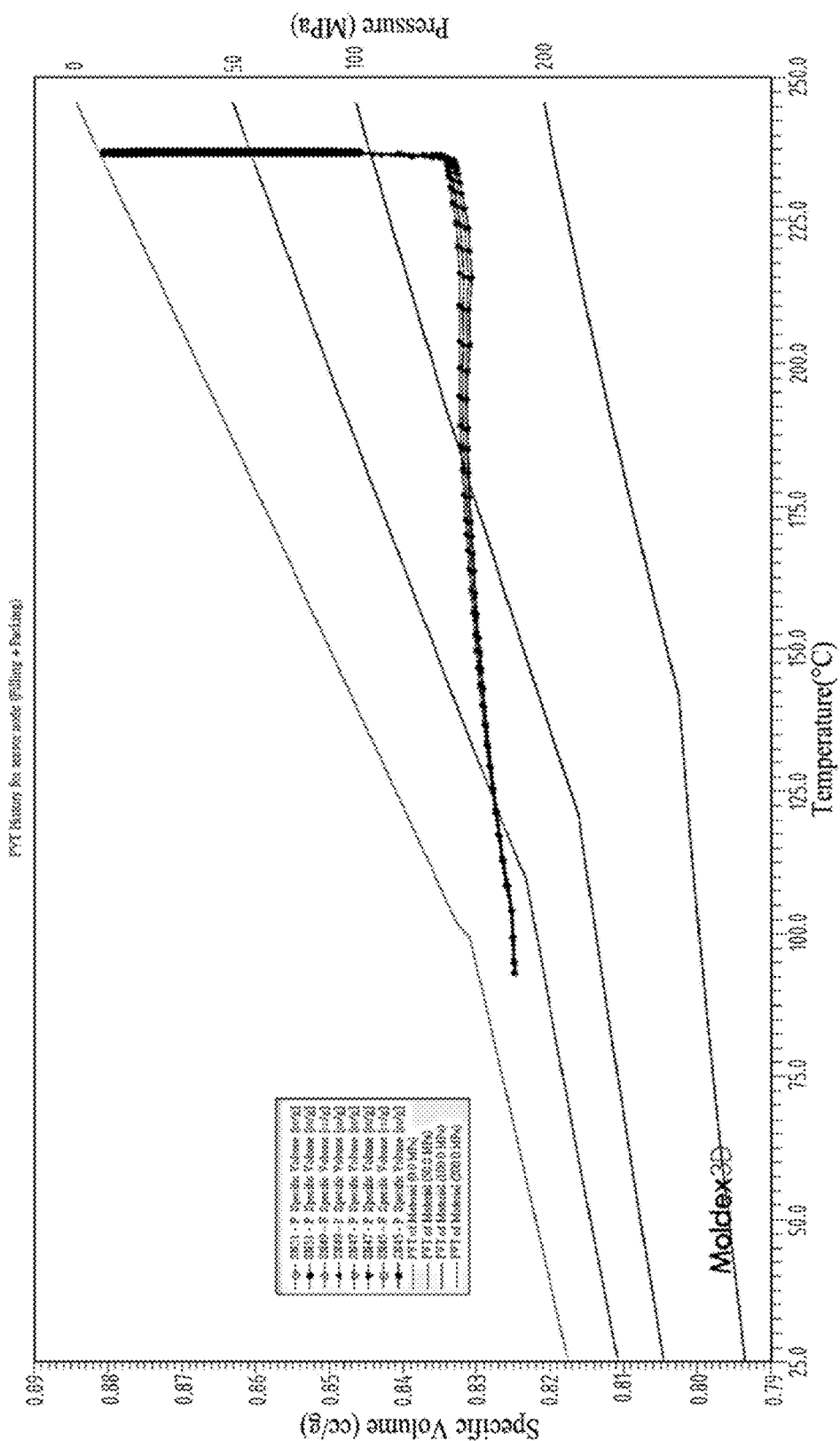
FIG. 29 is a schematic plot showing a plurality of state waveforms at different sensing sites of the molding resin in the simulated domain using the updated packing pressure profile in FIG. 28 in accordance with some embodiments of the present disclosure.

FIG. 28 is a schematic plot showing a packing pressure profile in accordance with some embodiments of the present disclosure, and FIG. 29 is a schematic plot showing a plurality of state waveforms at different sensing sites of the molding resin in the simulated domain 70 using the updated packing pressure profile in FIG. 28 in accordance with some embodiments of the present disclosure. The transition pressure from the filling phase into the packing phase in FIG. 28 is set (e.g., 98.89 MPa), and the corresponding initial in-mold pressure of the packing phase in FIG. 29 can be obtained accordingly (e.g., 141.1 MPa).

Figure 30:
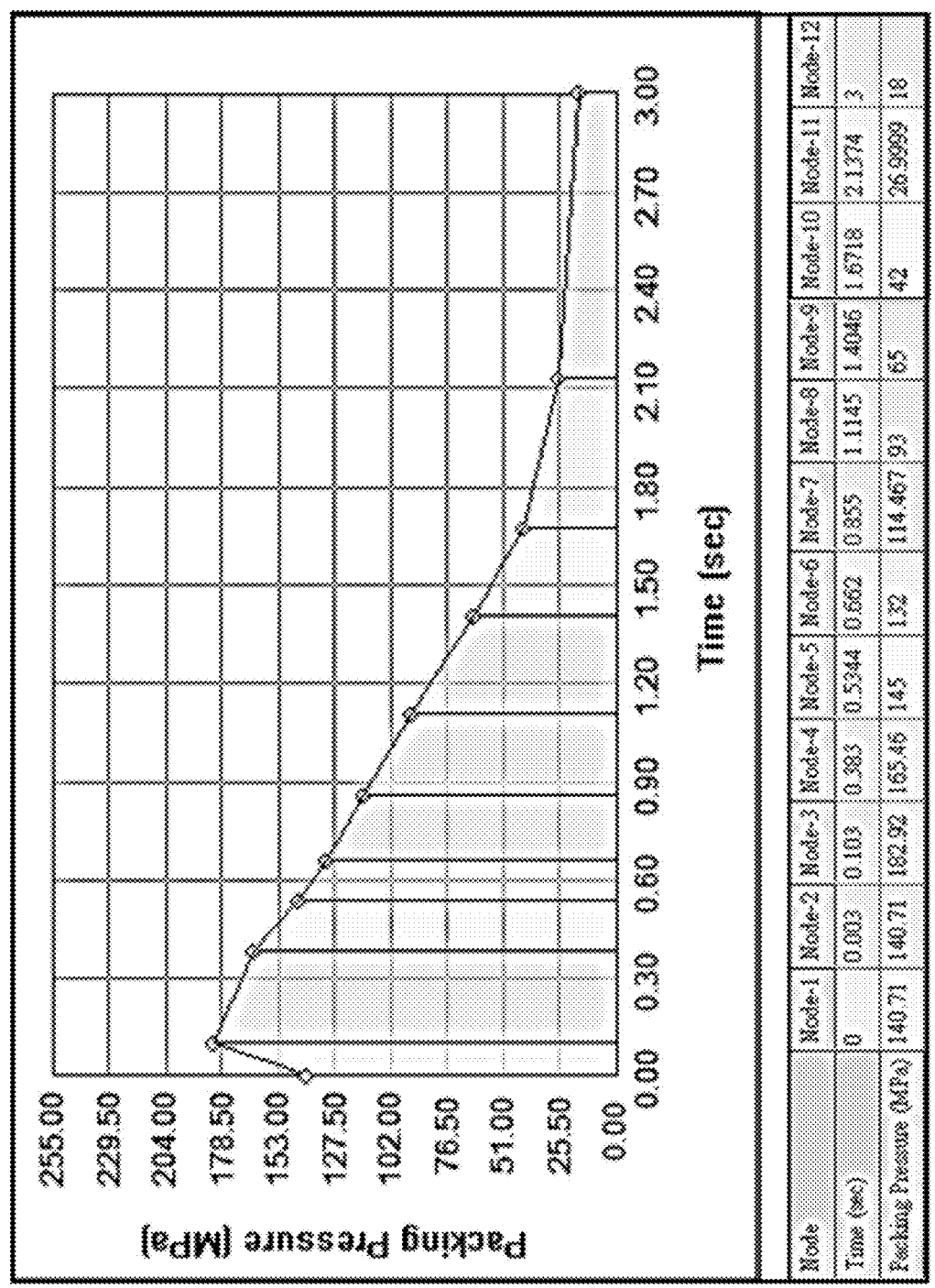
FIG. 30 is a schematic plot showing a packing pressure profile in accordance with some embodiments of the present disclosure.
Figure 31:
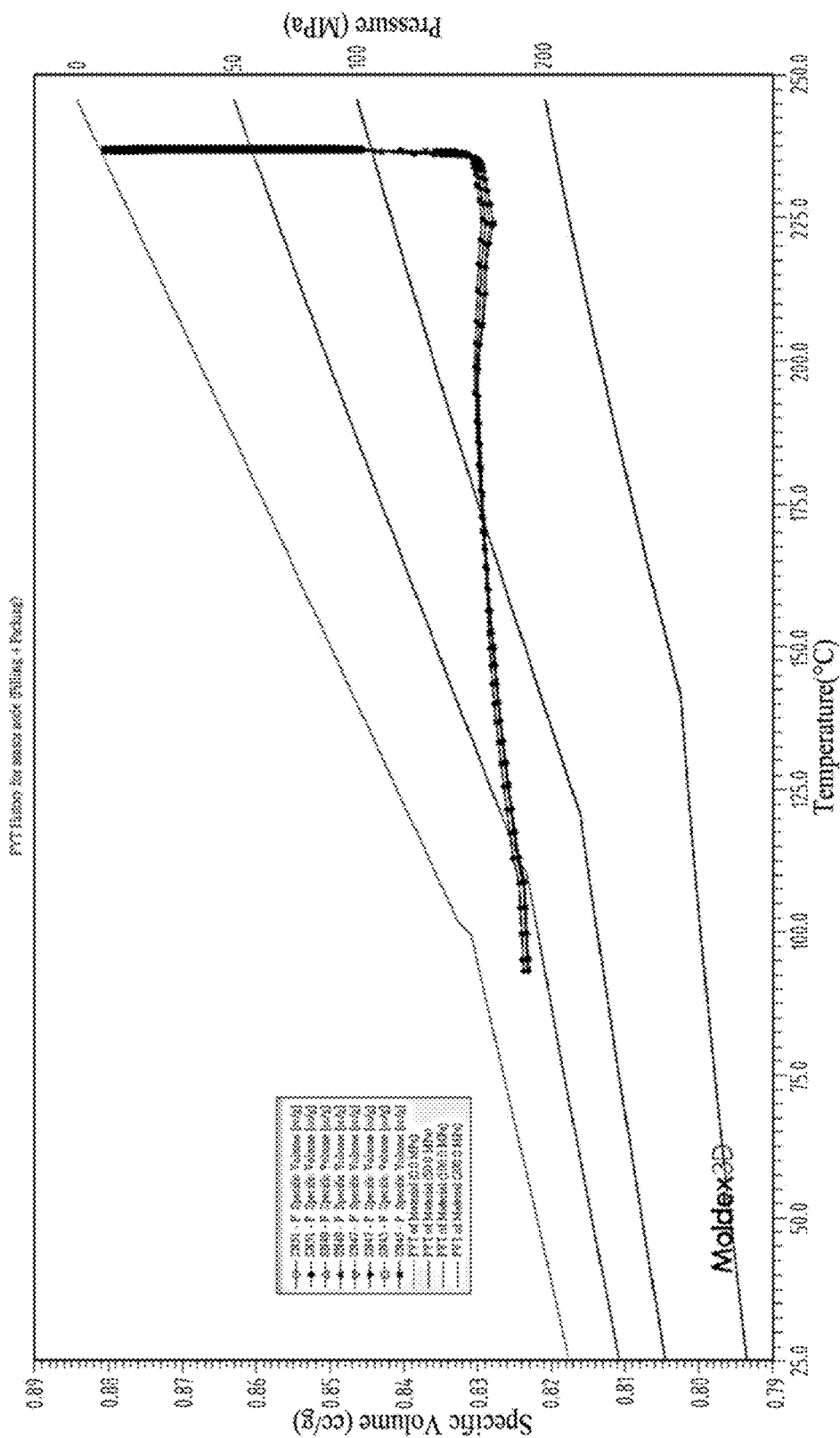
FIG. 31 is a schematic plot showing a plurality of state waveforms at different sensing sites of the molding resin in the simulated domain using the updated packing pressure profile in FIG. 30 in accordance with some embodiments of the present disclosure.

FIG. 30 is a schematic plot showing a packing pressure profile in accordance with some embodiments of the present disclosure, and FIG. 31 is a schematic plot showing a plurality of state waveforms at different sensing sites of the molding resin in the simulated domain 70 using the updated packing pressure profile in FIG. 30 in accordance with some embodiments of the present disclosure. In some embodiments of the present disclosure, the computing apparatus is configured to change the packing pressure profile in FIG. 28 by multiplying the packing pressures by a constant value so as to obtain the updated packing pressure profile in FIG. 30 for changing the packing pressure of the packing phase. In some embodiments of the present disclosure, the computing apparatus multiplies the packing pressures of the control nodes (Node-3 and Node-4) by a constant value to obtain the updated packing pressure profile in FIG. 30. Comparing FIG. 29 and FIG. 31, it is clear that the state waveforms are changed, e.g., the initial in-mold pressure of the isobaric phase is increased to 154.5 MPa.

Figure 32:
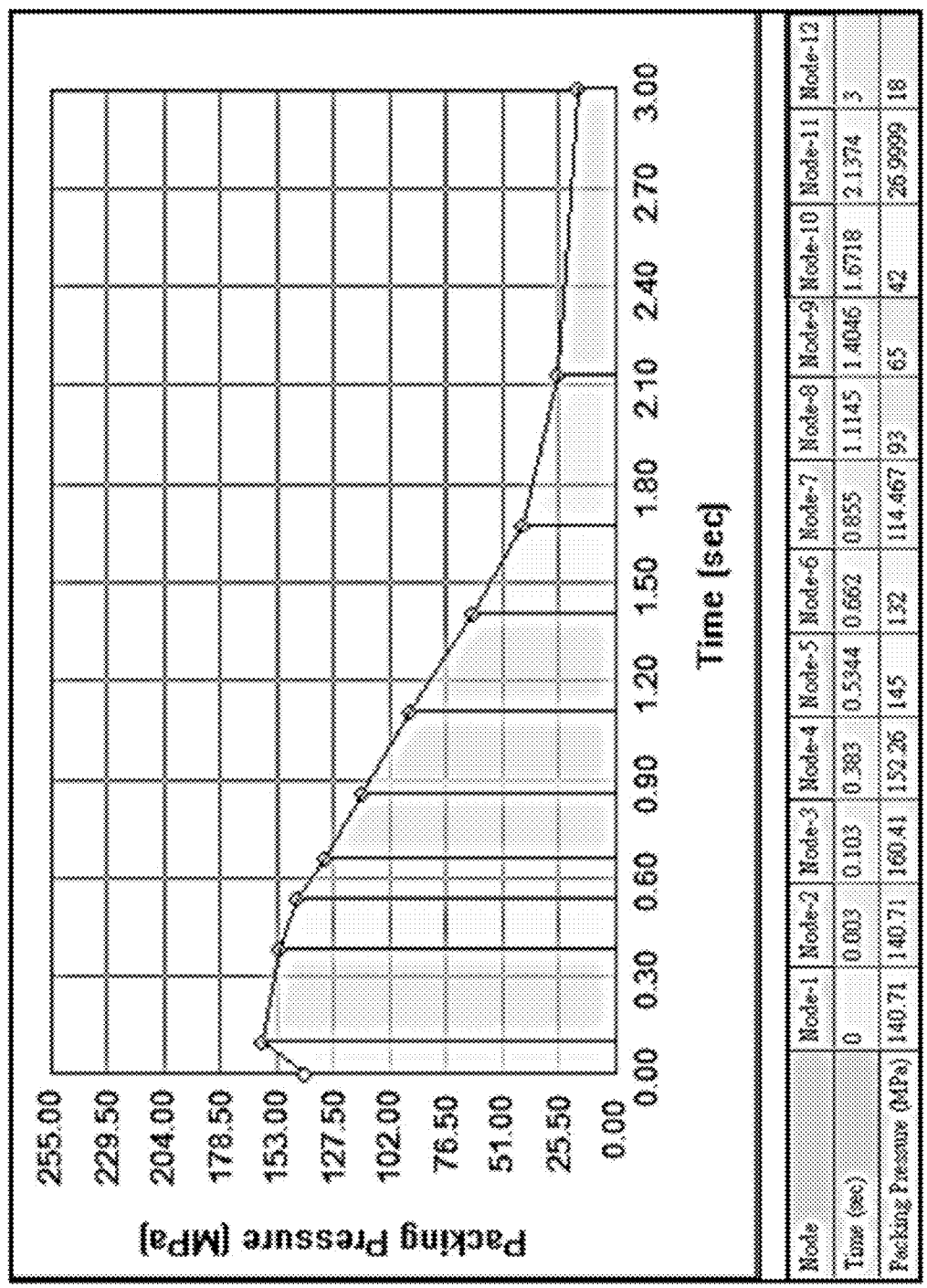
FIG. 32 is a schematic plot showing a packing pressure profile in accordance with some embodiments of the present disclosure.
Figure 33:
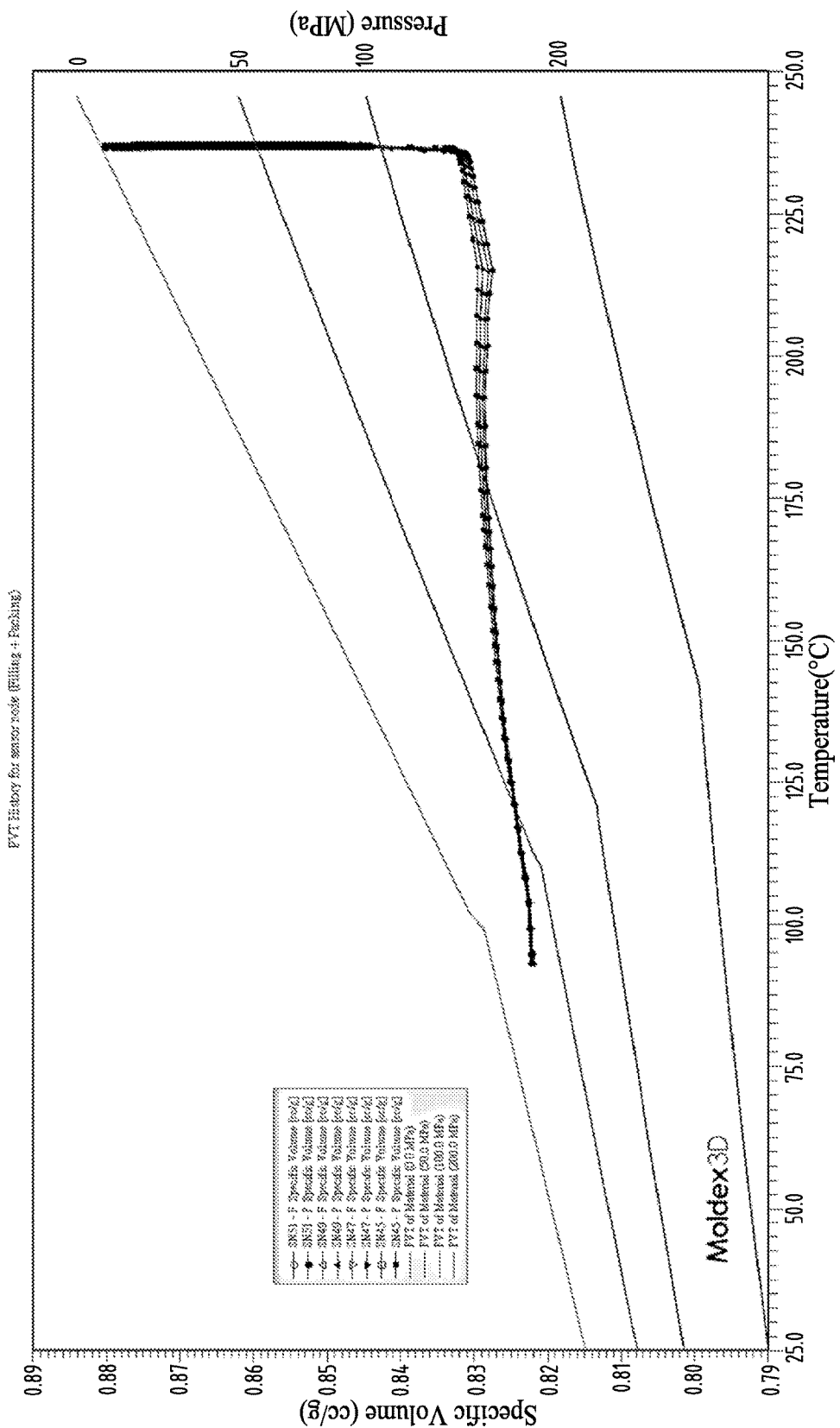
FIG. 33 is a schematic plot showing a plurality of state waveforms at different sensing sites of the molding resin in the simulated domain using the updated packing pressure profile in FIG. 32 in accordance with some embodiments of the present disclosure.

FIG. 32 is a schematic plot showing a packing pressure profile in accordance with some embodiments of the present disclosure, and FIG. 33 is a schematic plot showing a plurality of state waveforms at different sensing sites of the molding resin in the simulated domain 70 using the updated packing pressure profile in FIG. 32 in accordance with some embodiments of the present disclosure. The starting time of the packing phase in FIG. 32 is set (e.g., 0.383 second), and the corresponding duration of the packing phase in FIG. 33 can be obtained accordingly (e.g., about 0.28 second).

Figure 34:
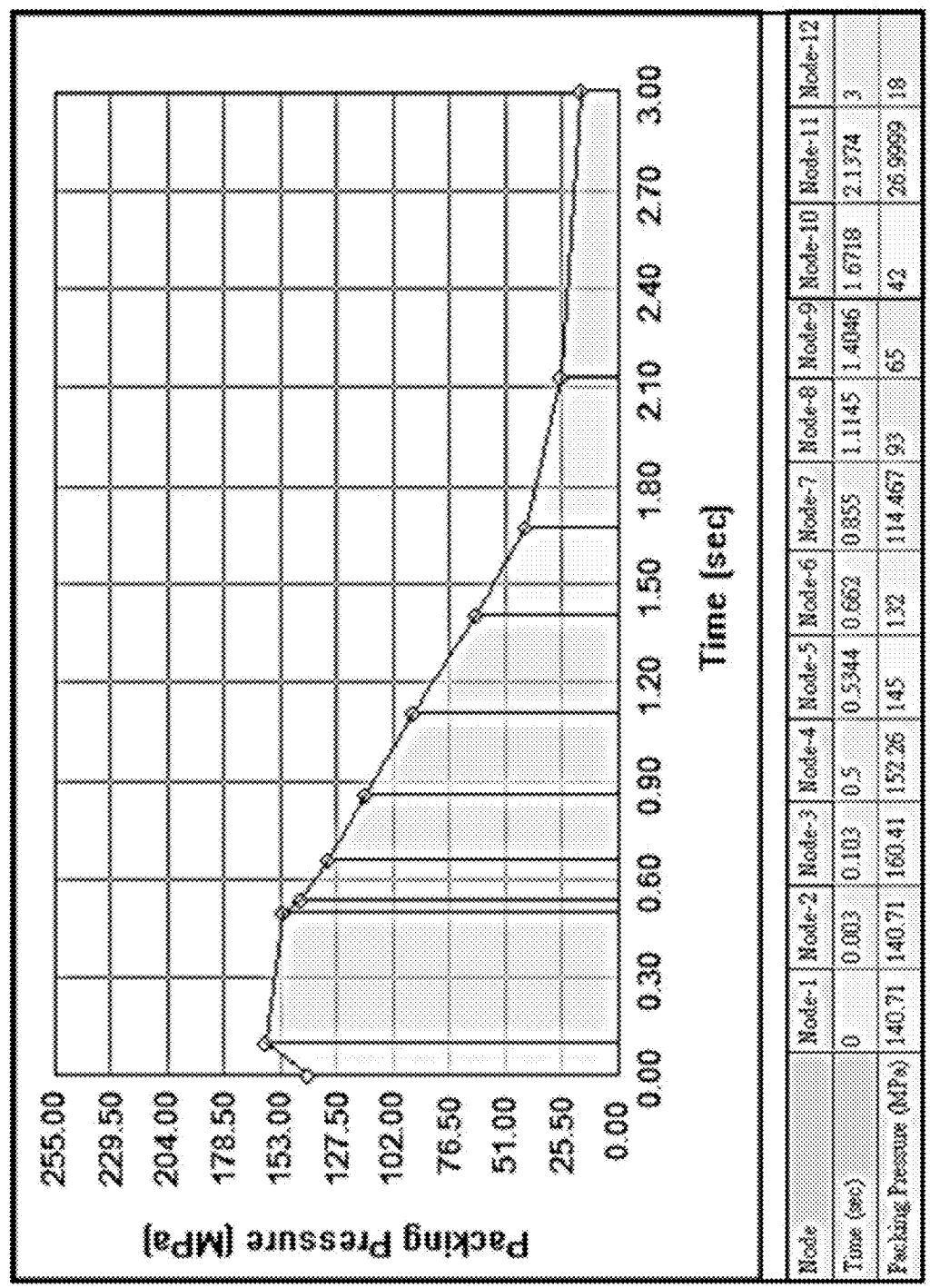
FIG. 34 is a schematic plot showing an updated packing pressure profile in accordance with some embodiments of the present disclosure.
Figure 35:
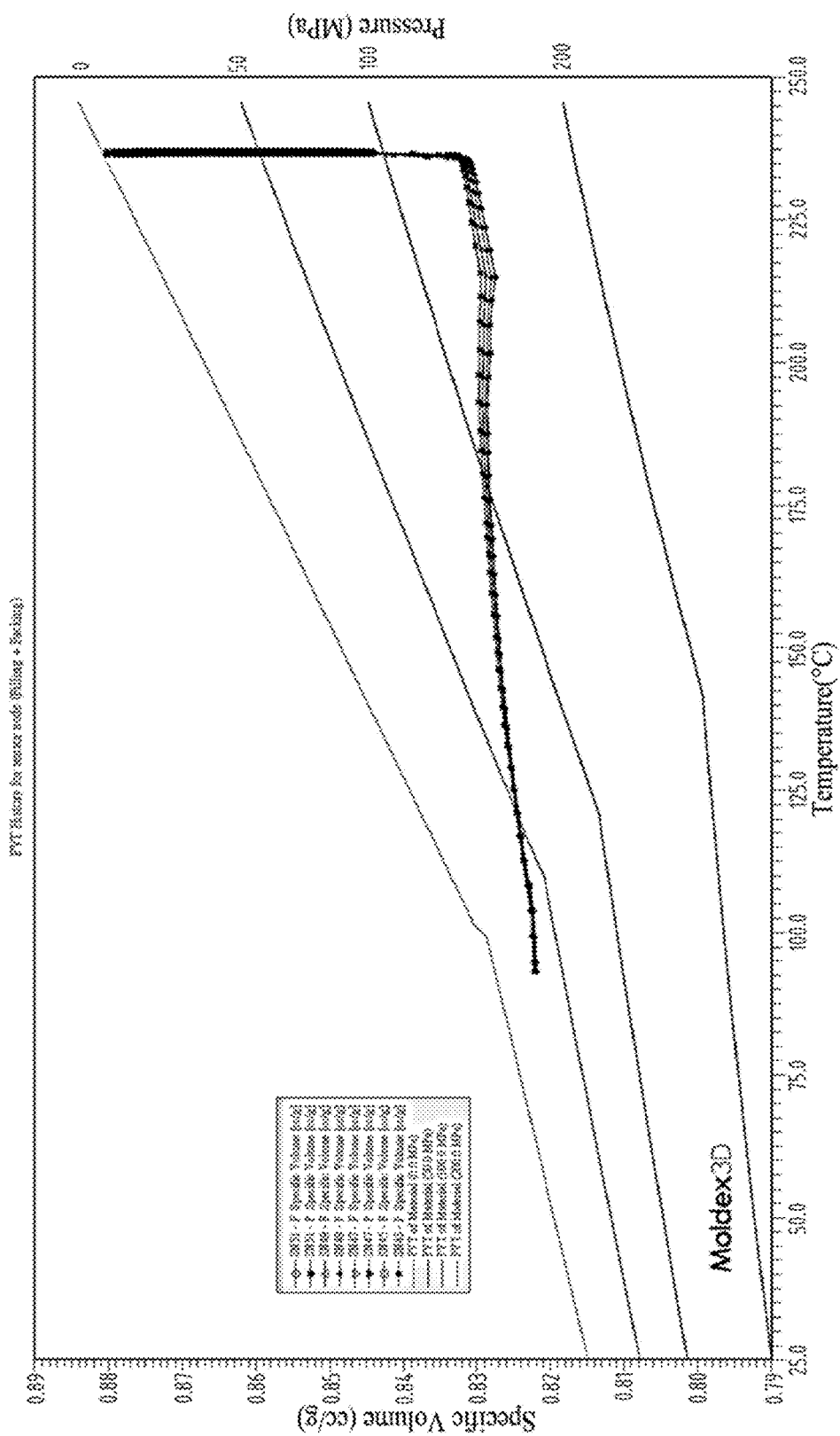
FIG. 35 is a schematic plot showing a plurality of state waveforms at different sensing sites of the molding resin in the simulated domain using the updated packing pressure profile in FIG. 34 in accordance with some embodiments of the present disclosure.

FIG. 34 is a schematic plot showing an updated packing to pressure profile in accordance with some embodiments of the present disclosure, and FIG. 35 is a schematic plot showing a plurality of state waveforms at different sensing sites of the molding resin in the simulated domain 70 using the updated packing pressure profile in FIG. 34 in accordance with some embodiments of the present disclosure. In some embodiments of the present disclosure, the computing apparatus is configured to change the packing pressure profile in FIG. 32 by changing the starting time of the control node (Node-4) so as to form the updated packing pressure profile in FIG. 34 for changing the duration of the packing phase in FIG. 35. In some embodiments of the present disclosure, the computing apparatus changes the packing time of the control node (Node-4), e.g., 0.5 second, to obtain the updated packing pressure profile in FIG. 34. Comparing FIG. 33 and FIG. 35, it is clear that the state waveforms are changed, in particular, the duration of the isobaric phase is increased (e.g., about 0.397 second).

The present disclosure adjusts the packing pressure profile based on the plurality of state waveforms expressing the relationship between an in-mold pressure and an in-mold temperature at different sensing sites of the molding resin, so that the packing pressure profile can be used by the molding machine to apply a packing pressure to the molding resin in the mold cavity such that the variation of the specific volume at these sensing sites are substantially the same as the temperature declines. Consequently, the shrinkage problem of the molding product can be effectively solved.

Although the present disclosure and its advantages have been described in detail, it should be understood that various changes, substitutions and alterations can be made herein without departing to from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A molding system, comprising:
  a molding machine;
  a mold disposed on the molding machine and having a mold cavity to be filled with a molding resin from the molding machine; and
  a computing means connected to the molding machine, wherein the computing means is configured to perform operations for setting the molding machine to prepare a molding product, the operations comprising:
  generating first and second state waveforms using a setting packing pressure profile, wherein the first and the second state waveforms express a relationship between an in-mold pressure and an in-mold temperature at different sensing sites of the molding resin, and wherein a maximum in-mold pressure of the first state waveform is larger than that of the second state waveform;
  obtaining an updated packing pressure profile having a first control node and a second control node after the first control node, wherein the first control node has a first packing time at which the first state waveform substantially reaches the maximum in-mold pressure, and wherein the first control node has a first packing pressure and the second control node has a second packing pressure smaller than the first packing pressure; and setting the molding machine based on the updated packing pressure profile to perform an actual molding process to prepare the molding product.

2. The molding system of claim 1, wherein the setting packing pressure profile has an initial packing pressure, and the computing apparatus is configured to obtain the first packing pressure based on the initial packing pressure.

3. The molding system of claim 1, wherein the first state waveform includes an isobaric phase and an isochoric phase following the isobaric phase, and the second control node has a second packing time corresponding to a transition between the isobaric phase and the isochoric phase.

4. The molding system of claim 1, wherein the molding resin has a first specific volume at a predetermined ejection temperature and a normal pressure, and a second specific volume at the predetermined ejection temperature and a designed pressure; and the second control node has a second packing time between a starting time and an ending time, wherein the starting time corresponds to a time at which the molding resin is isobarically cooled at the maximum in-mold pressure to reach the first specific volume and the ending time corresponding to a time at which the molding resin is isobarically cooled at the maximum in-mold pressure to reach the second specific volume.

5. The molding system of claim 1, wherein the second control node has a second packing pressure, and the computing apparatus is configured to obtain the second packing pressure based on the first packing pressure.

6. The molding system of claim 1, wherein the first and the second state waveforms have a first and a second ejection pressures, respectively, and the step of obtaining an updated packing pressure profile comprises:
calculating a first pressure deviation between the first ejection pressure and an expected ejection pressure, and a second pressure deviation between the second ejection pressure and the expected ejection pressure; and
adjusting the first packing pressure based on the first pressure deviation if the first pressure deviation is larger than the second pressure deviation.

7. The molding system of claim 1, wherein the updated packing pressure profile has a third control node after the second control node, wherein the third control node has a third packing time at which one of the first and the second state waveforms substantially reaches a maximum in-mold specific volume.

8. The molding system of claim 7, wherein
the first state waveform includes an isobaric phase and an isochoric phase following the isobaric phase, and the second control node has a second packing time corresponding to a transition between the isobaric phase and the isochoric phase; and
the computing apparatus is configured to obtain a third packing pressure of the third control node based on a designed pressure and the maximum in-mold pressure, wherein the designed pressure is obtained based on the in-mold temperature at the third packing time and an in-mold specific volume at the second packing time.

9. The molding system of claim 1, wherein the updated packing pressure profile has a third control node after the second control node, wherein the third control node has a third packing time at which a pressure difference between the first and the second state waveforms reaches a maximum value, and wherein the computing apparatus is configured to obtain a third packing pressure of the third control node based on the pressure difference.

10. The molding system of claim 1, wherein the computing apparatus is configured to add a third control node in the updated packing pressure profile if the molding resin is transferred from the molding machine into the mold cavity after the first state waveform substantially reaches the maximum in-mold pressure.

11. The molding system of claim 1, wherein the computing apparatus is configured to change the updated packing pressure profile by multiplying the first packing pressure and the second packing pressure by a constant value for changing an ejection pressure of the molding product.

12. The molding system of claim 1, wherein the computing apparatus is configured to change the updated packing pressure profile by multiplying the first packing pressure by a constant value.

13. The molding system of claim 1, wherein the first state waveform includes an isobaric phase and an isochoric phase following the isobaric phase, and the computing apparatus is configured to change the updated packing pressure profile by changing the second packing time for changing the isobaric phase.

14. The molding system of claim 1, wherein the operation of generating the first and second state waveforms is performed by a virtual molding process.

15. The molding system of claim 1, wherein the operation of generating the first and second state waveforms is performed by a plurality of sensors disposed at different sensing sites of the mold.

16. A molding system, comprising:
a molding machine;
a mold disposed on the molding machine and having a mold cavity to be filled with a molding resin from the molding machine; and
a computing means connected to the molding machine, wherein the computing means is configured to perform operations for setting the molding machine to prepare a molding product, the operations comprising steps of:
generating first and second state waveforms using a setting packing pressure profile, wherein the first and the second state waveforms express a relationship between an in-mold specific volume and an in-mold temperature at different sensing sites of the molding resin;
obtaining an updated packing pressure profile having a first control node, a second control node after the first control node, and a third control node after the second control node; and
setting the molding machine based on the updated packing pressure profile to perform an actual molding to prepare the molding product;
wherein the first control node has a first packing time at which one of the first and the second state waveforms substantially reaches a maximum in-mold pressure;
wherein the first state waveform includes an isobaric phase and an isochoric phase following the isobaric phase, and the second control node has a second packing time corresponding to a transition between the isobaric phase and the isochoric phase;
wherein the third control node has a third packing time at which one of the first and the second state waveforms substantially reaches a maximum in-mold specific volume; and
wherein the computing apparatus is configured to obtain a third packing pressure of the third control node based on a designed pressure and the maximum in-mold pressure, and the designed pressure is obtained based on the in-mold temperature at the third packing time and the in-mold specific volume at the second packing time.

17. The molding system of claim 16, wherein the updated packing pressure profile has a fourth control node after the third control node, the fourth control node has a fourth packing time at which a pressure difference between first and second state waveforms reaches a maximum value, and the computing apparatus is configured to obtain a fourth packing pressure of the fourth control node based on the pressure difference.

18. The molding system of claim 16, wherein the operation of generating the first and second state waveforms is performed by a virtual molding process.

19. The molding system of claim 16, wherein the operation of generating the first and second state waveforms is performed by a plurality of sensors disposed at different sensing sites of the mold.

20. A molding system, comprising:
a molding machine;
a mold disposed on the molding machine and having a mold cavity to be filled with a molding resin from the molding machine; and
a computing means connected to the molding machine, wherein the computing means is configured to perform operations for setting the molding machine to prepare a molding product, the operations comprising steps of:
generating first and second state waveforms using a setting packing pressure profile, wherein the first and the second state waveforms express a relationship between an in-mold pressure and an in-mold temperature at different sensing sites of the molding resin;
obtaining an updated packing pressure profile having a control node, wherein the control node has a packing time at which a pressure difference between the first and the second state waveforms reaches a maximum value, and wherein the computing apparatus is configured to obtain a packing pressure of the control node based on the pressure difference; and
setting the molding machine based on the updated packing pressure profile to perform an actual molding to prepare the molding product.

* * * * *